United States Patent [19]
Saito et al.

[11] Patent Number: 5,703,846
[45] Date of Patent: Dec. 30, 1997

[54] OPTICAL DISK TRACKING CONTROL METHOD, OPTICAL DISK DEVICE, AND OPTICAL DISK WITH INCREASED RECORDING DENSITY

[75] Inventors: Atsushi Saito, Hino; Hisataka Sugiyama, Kodaira, both of Japan

[73] Assignee: Hitachi, Ltd., Tokyo, Japan

[21] Appl. No.: 321,619

[22] Filed: Oct. 12, 1994

[30] Foreign Application Priority Data

Oct. 13, 1993 [JP] Japan ................ 5-255354

[51] Int. Cl.$^6$ .................................. G11B 7/00
[52] U.S. Cl. ................... 369/44.26; 369/44.34; 369/275.4
[58] Field of Search ............ 369/44.26, 44.34, 369/44.13, 275.2, 275.4, 111

[56] References Cited

U.S. PATENT DOCUMENTS

| | | | |
|---|---|---|---|
| 4,779,253 | 10/1988 | Getreuer et al. | 369/44.76 |
| 5,093,822 | 3/1992 | Kugiya et al. | 121/6.89 |
| 5,191,571 | 3/1993 | Fukumoto et al. | 369/44.34 X |
| 5,404,345 | 4/1995 | Taki | 369/44.26 |
| 5,410,531 | 4/1995 | Tsujioka | 369/110 |

FOREIGN PATENT DOCUMENTS

| | | | |
|---|---|---|---|
| 4006275 | 9/1979 | Germany . | |
| 2909770 | 9/1990 | Germany . | |
| 111235 | 4/1992 | Japan | 369/275.4 |

OTHER PUBLICATIONS

"Optical Components, Replicated Optics" product specification by Philips: Sep. 1994.
German Search Report dated Feb. 6, 1997 citing above listed references.

*Primary Examiner*—Thang V. Tran
*Attorney, Agent, or Firm*—Antonelli, Terry, Stout & Kraus, LLP.

[57] ABSTRACT

For use with an optical disk having a plurality of reference marks Mk arranged at intervals of P in the radial direction and deviant marks Hx (x=1, 2, ...) arranged so as to deviate in at least two different phases in the radial direction from the reference marks Mk, an optical disk tracking control method comprising the steps of: generating tracking error signals A, B, ... with at least two different phases obtained by addition and subtraction on combinations of the light quantity signal corresponding to the reference mark Mk and the light quantity signals corresponding to the deviant marks Hx; and positioning the data tracks at intervals of P/4 or less in the radial direction based on the tracking error signals A, B, ....

6 Claims, 23 Drawing Sheets

OPTICAL DISK TRACKING CONTROL METHOD, OPTICAL DISK DEVICE, AND OPTICAL DISK WITH INCREASED RECORDING DENSITY

BACKGROUND OF THE INVENTION

This invention relates to an optical disk tracking control method, an optical disk device, and an optical disk, and more particularly to an optical disk tracking control method, an optical disk device, and an optical disk, by which the recording density can be increased.

When recording, reproducing or erasing data on an optical disk, it is necessary to perform access control and tracking control to an object track on the optical disk.

As the conventional access control or tracking control method, the so-called "sample servo system" is well known.

As a format for an optical disk which is compatible with the "sample servo system", for example, DBF (discrete block format) reported in ISO/IEC JTC1 INFORMATION TECHNOLOGY "SC 23 Optical Digital Data Disks", 1990. 3. 12 is well known.

As shown in FIG. 15, servo areas 1582, 1582, . . . for detecting servo signals are provided every certain angle of the optical disk, and data areas 1584, 1584, . . . on which data is recorded are provided between the servo areas 1582, 1582, . . . .

As shown in FIG. 16, in the servo area 1582, clock marks are arranged at intervals of P in the radial direction of the optical disk 1500, wobble marks A are arranged which are displaced by P/4 toward the outside of the radial direction from the clock marks, and wobble marks B are arranged which are displaced by P/4 toward the inside of the radial direction from the clock marks. In other words, in the servo area 1582, there are columns of marks arranged in a total of three different phases, that is, a column of marks of a datum phase, columns of marks of two different phases. In addition, access marks are arranged at the same radial positions as the clock marks.

On the other hand, in the data area 1584, data marks are arranged at the same radial positions as the access marks.

Therefore, the clock marks, access marks and data marks, which are located at the same radial positions on the optical disk 1500, constitute a data track 1513. The intervals between the data tracks 1513 are P.

The marks are recording traces, such as holes, undulations, deformation, changes of phase, or the like, which give changes to the reflected light, and the marks may be pits.

FIG. 17 is a block diagram of an optical disk device for reproducing data from and recording data on the optical disk 1500 mentioned above.

This optical disk device 1700 includes an optical disk 1500, a spindle motor 102, an optical head 104, an access means 105, a signal detector 106, a tracking controller 1701, and a recording/reproducing device 1702.

The optical disk 1500 is driven to rotate by a spindle motor 102.

A laser beam from the optical head 104 mounted on the access means 1500 is converged to form a light spot on the optical disk 1500. The diameter of the light spot is P/4 to P. The light intensity is distributed in a Gaussian distribution, for example.

A reflected light from the optical disk 1500 is received by the optical head 104, converted into an electric signal, and guided to the signal detector 106. From the electric signal, the signal detector 106 generates a total light quantity signal Sa representing a total light quantity of the reflected light, and also generates a data signal Sd.

The tracking controller 1701 includes a servo clock generator 1508, a servo signal detector 1512, and a servo controller 1514.

The PLL in the servo clock generator 1508 generates a servo clock signal for detecting a servo signal and sample-and-hold signals Ts in synchronism with changes in the total light quantity signal Sa when the light spot passes the clock marks on the optical disk 1500. Those signals are sent to the servo signal detector 1512.

The servo signal detector 1512 generates tracking error signals and a position signal St representing the position of the light spot from the total light quantity Sa on the basis of the servo clock signal and the sample-and-hold signals Ts. Those signals are sent to the servo controller 1514.

The servo controller 1514 generates a servo control signal by using the tracking error signals and the position signal St in response to a command from the upper-level controller (not shown). The servo control signal is sent to the access means 105 so that the access means 105 can perform an access action and a tracking action.

The recording/reproducing device 1702 includes a data clock generator 110, an data reproducing circuit 120, an error correcting circuit 122, and a data recording circuit 124.

The PLL in the data clock generator 110 generates a data clock signal and a timing signal Td for recording or reproducing data in synchronism with changes in the total light quantity signal Sa when the light spot passes the clock marks on the optical disk 1500. Those signals are sent to the data reproducing circuit 120 and the data recording circuit 124.

The data reproducing circuit 120 extracts data from the data signal Sd using the data clock signal and the timing signal Td for recording or reproducing data, and demodulates the data in compliance with the modulation and demodulation rules. The demodulated data is sent to the error correcting circuit 122, and errors in the data are corrected by an ECC (error correction code), for example. Data having had its error corrected is sent through an input/output interface (not shown) to a upper-level apparatus. When data to be recorded is sent from the upper-level apparatus through the input/output interface, the error correcting circuit 122 adds the ECC to the data, and sends the data to the data recording circuit 124.

The data recording circuit 124 modulates the data, and generates a data recording signal for recording on the optical disk 1500 based on the clock signal and the timing signal Td for recording and reproducing data, and outputs the data to the access means 105.

FIG. 18 is a diagram showing the timing between changes in total light quantity signal Sa and the sample-and-hold signals Ts.

The sample-and-hold signals Ts include a sample-and-hold signal TsA timed with the wobble marks A and a sample-and-hold signal TsB timed with the wobble marks B.

FIG. 19 is a circuit diagram showing that portion of the servo signal detector 1512 which generates tracking error signals.

A sample-and-hold circuit 150a samples and holds the total light quantity signal Sa based on the sample-and-hold signal TsA, and therefore holds the light quantity signal corresponding to the wobble mark A.

A sample-and-hold circuit 150b samples and holds the total light quantity signal Sa based on the sample-and-hold signal TsB, and therefore holds the light quantity signal corresponding to the wobble mark B.

A differential circuit 152 subtracts the light quantity signal corresponding to the wobble mark B from the light quantity signal corresponding to the wobble mark A to generate a tracking error signal. The tracking error signal is held until the light spot has passed the next servo area.

FIG. 20 is a waveform diagram showing a tracking error signal when the light spot is displaced in the radial direction of the optical disk 1500.

The data tracks 1513 (FIG. 16) can be positioned at intervals of P in the radial direction by detecting zero cross points where the polarity of the tracking error signal changes from minus to plus when the light spot is displaced toward the outside of the radial direction (or the zero cross points where the polarity of the tracking error signal changes from plus to minus when the light spot is displaced toward the inside of the radial direction).

FIG. 21 is a circuit block diagram showing the servo controller 1514.

When an access command, a target track, and a target access mark are input from the upper-level controller, first of all, the switch 1571 closes. A velocity control signal generating circuit 162 generates a velocity control signal Sv from the position signal and the target access mark. The access means controller 1566 starts an access action of radially positioning the light spot to the target access mark on the basis of the velocity control signal Sv. When the light spot reaches the vicinity of the target access mark, the switch 1571 opens and at the same time the switch 1573 closes, so that a tracking error signal is input to the access means controller 1566 through a phase compensator 1564. Therefore, the access means controller 1566 positions the light spot to the target access mark, and at the same time, starts a tracking action.

In the conventional optical disk device 1700 and optical disk 1500, the data tracks 1513 (FIG. 16) are provided at intervals of P in the radial direction. However, under the above-mentioned arrangement, there is a problem that the recording density is not sufficient.

Meanwhile, there has been proposed a servo controller 1514' shown in FIG. 22.

This servo controller 1514' differs from the above-mentioned servo controller 1514 since an improvement has been made such that the servo controller 1514' inverts a tracking error signal mentioned above by an inverter circuit 1580, and can select either the tracking error signal or an inverted tracking error signal through the operation of a switch 1573'.

According to this servo controller 1514', as shown in FIG. 23, the data tracks can be positioned at intervals of P/2 in the radial direction. Hence, as shown in FIG. 24, an optical disk 1500' can be obtained in which the data tracks 1512 are provided at intervals of P/2 in the radial direction.

However, there still remains a problem that despite the above-mentioned improvement, the recording density is not yet sufficient.

SUMMARY OF THE INVENTION

Therefore, the object of the present invention is to provide an optical disk tracking control method, an optical disk device, and an optical disk, by which the recording density can be increased.

In a first aspect of the present invention, there is provided for use with an optical disk having a plurality of reference marks Mk arranged at intervals of P in the radial direction and deviant marks Hx (x=1, 2, ...) arranged in at least two different phases deviating in the radial direction from each reference mark Mk, an optical disk tracking control method is made up of:

generating tracking error signals A, B, ... of at least two different phases by addition and subtraction performed on combinations of a light quantity signal corresponding to the reference mark Mk and light quantity signals corresponding to the deviant marks Hx; and positioning the data tracks at intervals of P/4 or less in the radial direction based on the tracking error signals A, B, ....

In a second aspect of the present invention, there is provided an optical disk device for reproducing data from and recording data on an optical disk having a plurality of reference marks Mk arranged at intervals of P in the radial direction and deviant marks Hx (x=1, 2, ...) of at least two different phases arranged so as to deviate in the radial direction from each reference mark Mk, an optical disk device made up of a servo signal detector for generating tracking error signals A, B, ... of at least two different phases by addition and subtraction performed on combinations of a light quantity signal corresponding to the reference mark and the light quantity signals corresponding to the deviant marks Hx, and a servo controller for generating a servo control signal for positioning the data tracks at intervals of P/4 or less in the radial direction based on the tracking error signals.

In a third aspect of the present invention, there is provided an optical disk characterized in that a plurality of reference marks Mk are arranged at intervals of P in the radial direction, that deviant marks Hx (x=1, 2, ...) of at least two different phases are provided so as to deviate in the radial direction from each reference mark, and that the data tracks are arranged at intervals of P/4 or less in the radial direction.

In the optical disk tracking control method, the optical disk device, and the optical disk, a plurality of reference marks Mk are arranged at intervals of P in the radial direction of an optical disk, and deviant marks Hx (x=1, 2, ...) of at least two different phases are arranged so as to deviate in the radial direction from each reference mark Mk. Tracking error signals A, B, ... of at least two different phases are generated by addition and subtraction performed on combinations of a light quantity signal corresponding to the reference mark Mk and light quantity signals corresponding to the deviant marks Hx. Based on the tracking error signals A, B, ..., data tracks are positioned at intervals of P/4 or less in the radial direction.

To give an example, a plurality of reference marks Mk are arranged at intervals of P in the radial direction of an optical disk, deviant marks H1 are arranged so as to deviate by P/4 toward the outside of the radial direction from the reference marks Mk, and deviant marks H2 are arranged so as to deviate by P/4 toward the inside of the radial direction from the reference marks Mk. For this optical disk, a tracking error signal A is generated by subtracting a light quantity signal corresponding to the reference mark Mk from a light quantity signal corresponding to the deviant mark H1, and a tracking error signal B is generated by subtracting a light quantity signal corresponding to the deviant mark H2 from a light quantity signal corresponding to the light quantity signal corresponding to the reference mark Mk. By detecting zero cross points for the tracking error signals A and B and tracking error signals −A and −B, which are obtained by inverting the tracking error signals A and B, the data tracks are positioned at intervals of P/4 in the radial direction.

Alternatively, a plurality of reference marks Mk are arranged at intervals of P in the radial direction of an optical disk, deviant marks H1 are arranged so as to deviate by P/4 toward the outside of the radial direction of an optical disk, and deviant marks H2 are arranged so as to deviate by P/4 toward the inside of the radial direction from the reference marks Mk. For this optical disk, a tracking error signal A is generated by subtracting a light quantity signal corresponding to the reference mark Mk from a light quantity signal corresponding to the deviant mark H1, a tracking error signal B is generated by subtracting a light quantity signal corresponding to the deviant mark H2 from a light quantity signal corresponding to the reference mark Mk, a tracking error signal C is generated by subtracting a light quantity corresponding to the deviant mark H2 from a light quantity corresponding to the deviant mark H1, and a tracking error signal D is generated by subtracting the tracking error signal B from the tracking error signal A. By detecting zero cross points for the tracking error signals C and D and tracking error signals –C and –D obtained by inverting the tracking error signals C and D>

Alternatively, a plurality of reference Mk are arranged at intervals of P in the radial direction of an optical disk, deviant marks H1 are arranged so as to deviate by P/4 toward the outside of the radial direction from the reference marks Mk, and deviant marks H2 are arranged by P/4 toward the inside of the radial direction from the reference marks Mk. For this optical disk, a tracking error signal A is generated by subtracting a light quantity signal corresponding to the reference mark Mk from a light quantity signal corresponding to the deviant mark H1, a tracking error signal B is generated by subtracting a light quantity signal corresponding to the deviant mark H2 from a light quantity signal corresponding to the reference mark Mk, a tracking error signal C is generated by subtracting a light quantity signal corresponding to the deviant mark H2 from a light quantity signal corresponding to the deviant signal H1, and a tracking error signal D is generated by subtracting the tracking error signal B from the tracking error signal A. By detecting zero cross points for the tracking error signals A, B, C and D and tracking error signals –A, –B, –C and –D obtained by inverting the tracking error signals A, B, C and D, the data tracks are positioned at intervals of P in the radial direction.

As has been described, since the data tracks can be positioned at intervals of P/4 or less, a recording density higher than before can be achieved.

DESCRIPTION OF THE PREFERRED EMBODIMENTS

The present invention will be described in detail by referring to the embodiments shown in the accompanying drawings. It is to be understood, however, that they are not intended to show the limits of the present invention.

Figure 1:
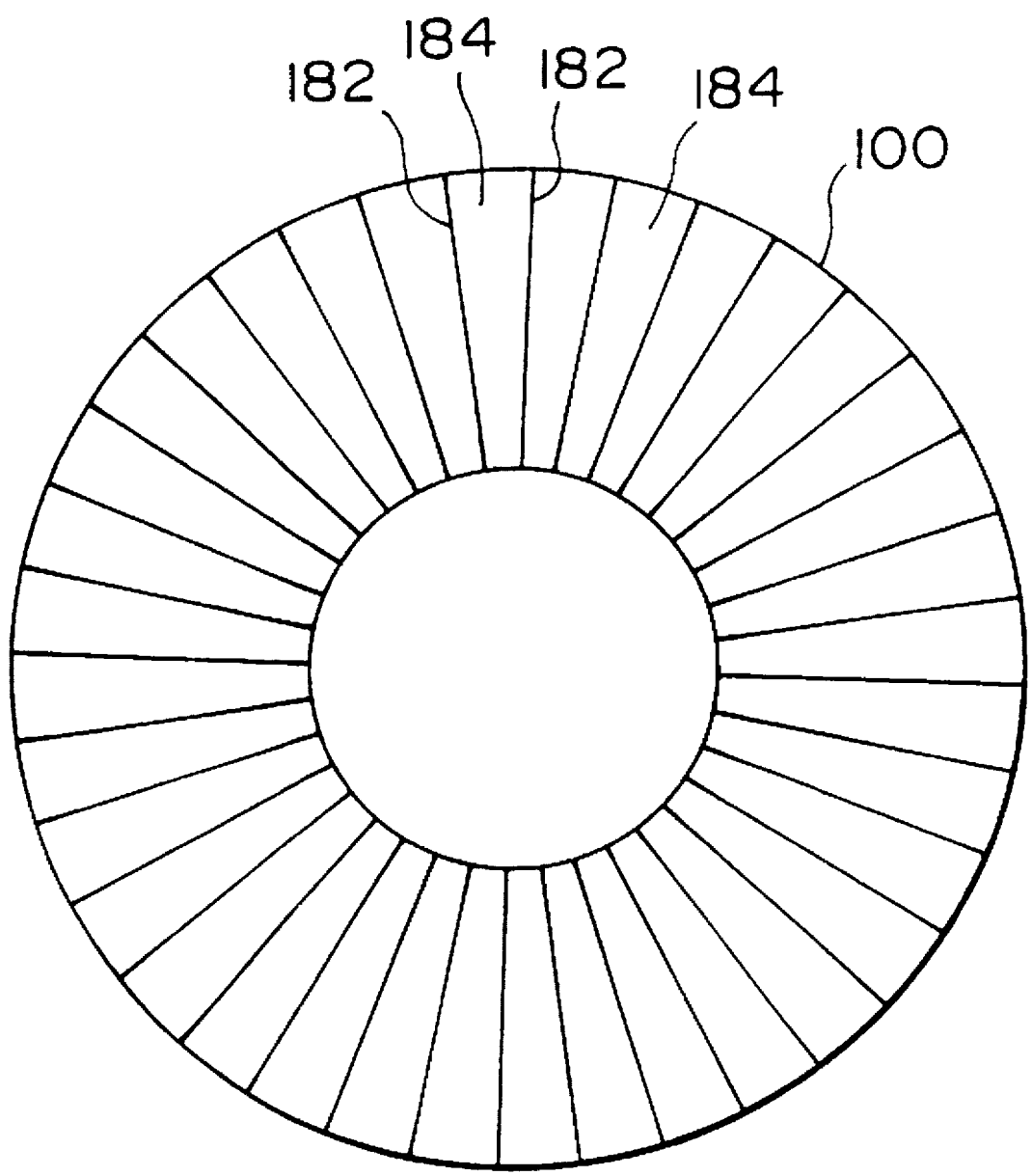
FIG. 1 is a plan view of an optical disk according to a first embodiment of the present invention.

FIG. 1 is a plan view of an optical disk according to a first embodiment of the present invention.

This optical disk 100 conforms to the DBF, and therefore the servo areas 182, 182, ... for detecting a servo signal are provided at fixed angle intervals, and data areas 184, 184 ... for recording data are provided between the servo areas 182, 182, ....

Figure 2:
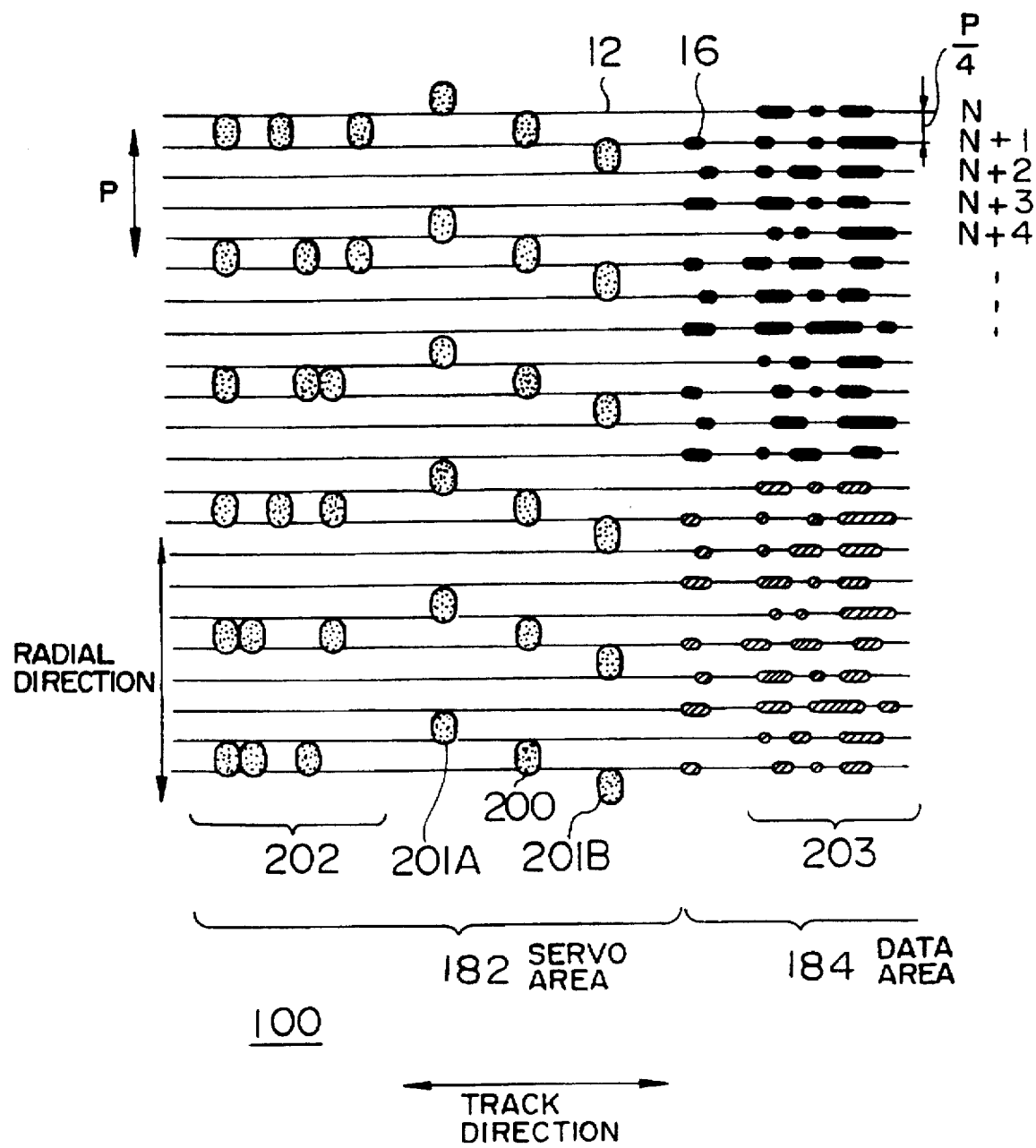
FIG. 2 is a partial view, on an enlarged scale, of the optical disk in FIG. 1.

As shown in FIG. 2, in the servo area 182, clock marks 200 are arranged at intervals of P in the radial direction of the optical disk 100, wobble marks 201A are arranged so as to deviate by P/4 toward the outside of the radial direction from the clock marks, and wobble marks 201B are arranged so as to deviate by P/4 toward the inside of the radial direction from the clock marks. In other words, in the servo area 182, there are columns of marks arranged in a total of three phases, that is, a column of a base phase and columns of two different phases. In addition, access marks 202 are arranged at the same radial positions as the clock marks mentioned above.

On the other hand, in the data area 184, data tracks 12 are arranged at intervals of P/4. On each data track, data marks 203 are recorded and ID marks 16 are added when necessary.

The marks are recording traces, such as holes, undulations, deformation, changes of phase or the like, which give changes to the reflected light, and the marks may be pits.

Figure 3:
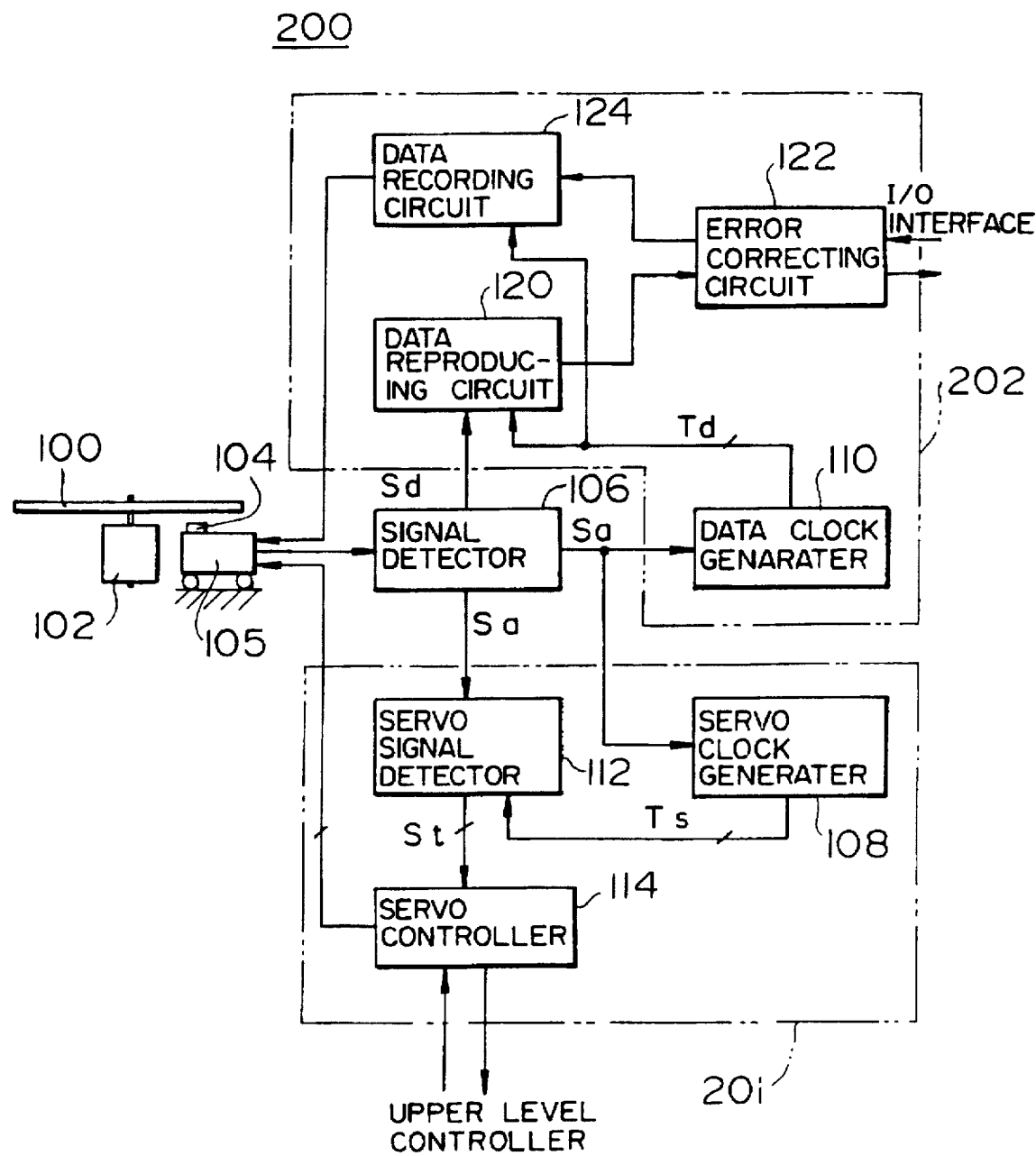
FIG. 3 is a block diagram showing an optical disk device using the optical disk in FIG. 1.

FIG. 3 is a block diagram of an optical disk device for reproducing data from and recording data onto the optical disk 100 mentioned above.

This optical disk device 200 includes an optical disk 100, a spindle motor 102, an optical head 104, an access means 105, a signal detector 106, a tracking controller 201, and a recording/reproducing device 202.

The optical disk 100 is driven to rotate by a spindle motor 102.

A laser beam from the optical head 104 mounted on the access means 105 is converged to form a light spot on the optical disk 100. The diameter of the light spot is P/4 to P. The light intensity is distributed in a Gaussian distribution, for example.

A reflected light from the optical disk 100 is received by the optical head 104, converted into an electric signal, and guided to the signal detector 106. From the electric signal, the signal detector 106 generates a total light quantity signal Sa representing a total light quantity of the reflected light, and also generates a data signal Sd.

The tracking controller 201 includes a servo clock generator 108, a servo signal detector 112, and a servo controller 114.

The PLL in the servo clock generator 108 generates a servo clock signal for detecting a servo signal and a sample-and-hold signals Ts in synchronism with changes in the total light quantity signal Sa when the light spot passes the clock marks on the optical disk 100. Those signals are sent to the servo signal detector 12.

The servo signal detector 112 generates tracking error signals and a position signal St representing the position of the light spot from the total light quantity signal Sa on the basis of the servo clock signal and the sample-and-hold signals Ts. Those signals are sent to the servo controller 114.

The servo controller 114 generates a servo control signal by using the tracking error signals and the position signal St in response to a command from an upper-level controller (not shown). The servo control signal is sent to the access means 105 so that the access means 105 can perform an access action and a tracking action.

The recording/reproducing device 202 includes a data clock generator 110, a data reproducing circuit 120, an error correcting circuit 122, and a data recording circuit 124.

The PLL in the data clock generator 110 generates a data clock signal and a timing signal Td for recording or reproducing data in synchronism with changes in the total light quantity signal Sa when the light spot passes the clock marks on the optical disk 100. Those signals are sent to the data reproducing circuit 120 and the data recording circuit 124.

The data reproducing circuit 120 extracts data from the data signal Sd by using the data clock and the timing signal Td for recording and reproducing data, and demodulates the data in compliance with the modulation and demodulation laws. The demodulated data is sent to the error correcting circuit 122, and errors in the data are corrected by an ECC (error correction code), for example. Data having had its errors corrected is sent through an input/output interface (not shown) to the upper-level apparatus. When data to be recorded is sent from the upper-level apparatus through the input/output interface, the error correcting circuit 122 adds the ECC to the data, and sends the data to the data recording circuit 124.

The data recording circuit 124 modulates the data, and generates a data recording signal for recording on the optical disk 100 based on the clock signal and the timing signal Td for recording and reproducing data, and outputs the data to the access means 105.

Figure 4:
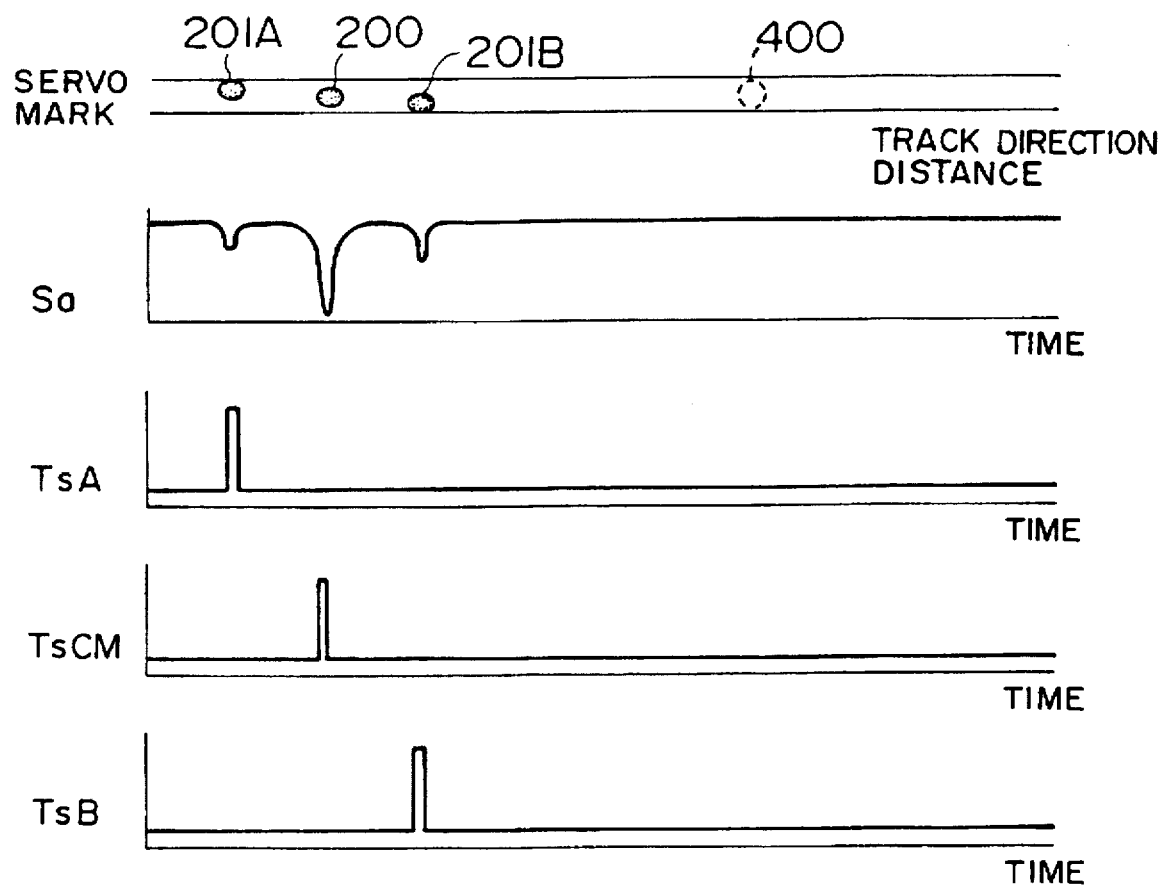
FIG. 4 is an explanatory diagram of a total light quantity signal and sample-and-hold signals.

FIG. 4 is diagram for explaining the timing between changes in the total light quantity signal Sa and the sample-and-hold signals. The light spot is designated by reference numeral 400.

The sample-and-hold signals Ts include a sample-and-hold signal TsA timed with the wobble mark 201A, a sample-and-hold signal TsCM timed with the clock mark 200, and a sample-and-hold signal TsB timed with the wobble mark 201B.

Figure 5:
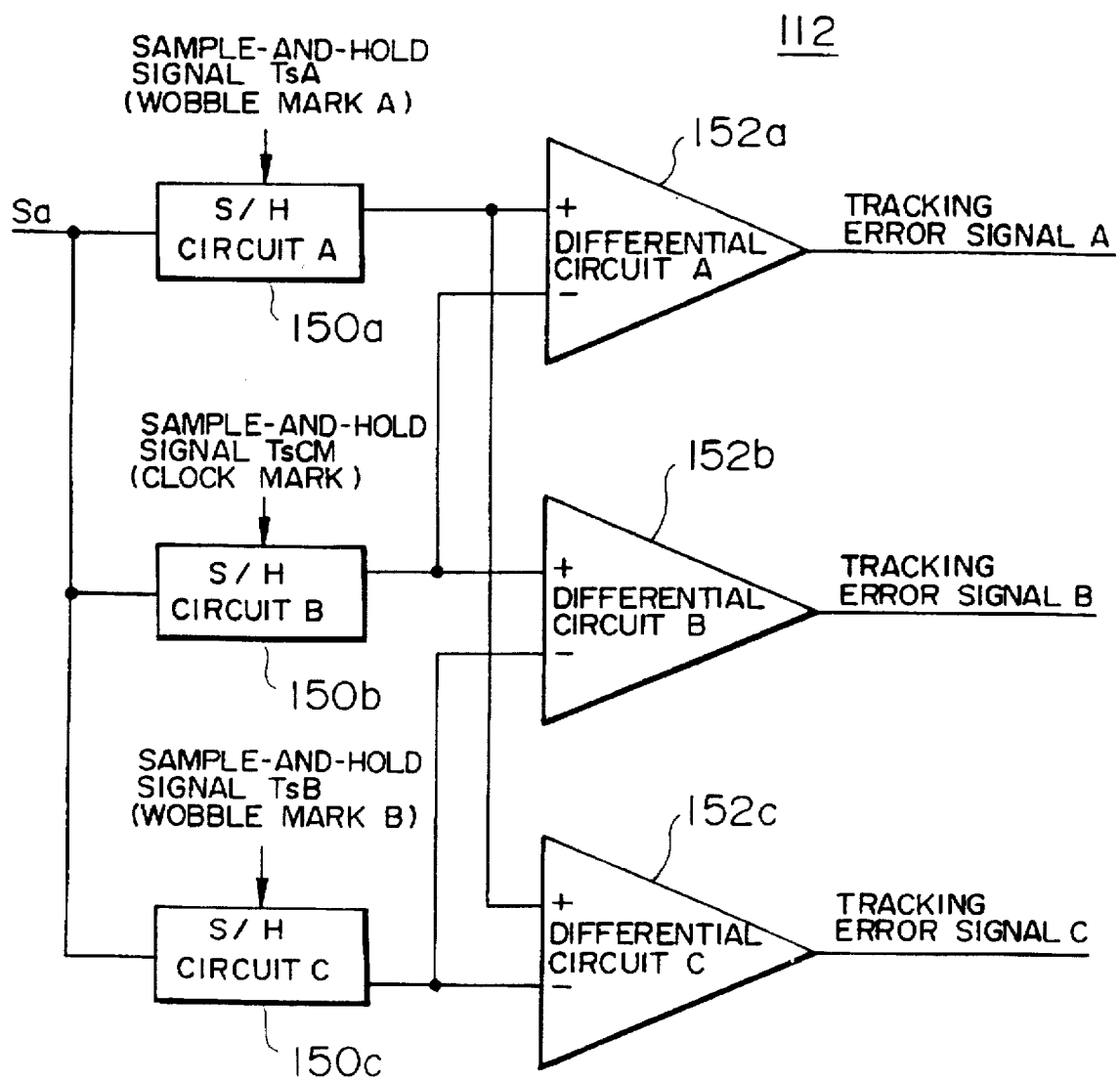
FIG. 5 is circuit block diagram showing a servo signal detector according to the first embodiment of the present invention.

FIG. 5 is a circuit diagram showing that portion of the servo signal detector 112 which generates tracking error signals.

A sample-and-hold circuit 150a samples and holds the total light quantity signal Sa based on the sample-and-hold signal TsA, and therefore holds the light quantity signal corresponding to the wobble mark A.

A sample-and-hold circuit 150b samples and holds the total light quantity signal Sa based on the sample-and-hold signal TsCM, and therefore holds the light quantity signal corresponding to the clock mark.

A sample-and-hold circuit 150c samples and holds the total light quantity signal Sa based on the sample-and-hold signal TsB, and therefore holds the light quantity signal corresponding to the wobble mark B.

A differential circuit 152a subtracts the light quantity signal corresponding to the clock mark from the light quantity signal corresponding to the wobble mark A to generate a tracking error signal A.

A differential circuit 152b subtracts the light quantity signal corresponding to the wobble mark B from the light quantity signal corresponding to the clock mark to generate a tracking error signal B.

A differential circuit 152c subtracts the light quantity signal corresponding to the wobble mark B from the light quantity signal corresponding to the wobble mark A to generate a tracking error signal C.

Note that the tracking error signals A, B and C are held until the light spot has passed the next servo area.

Figure 6:
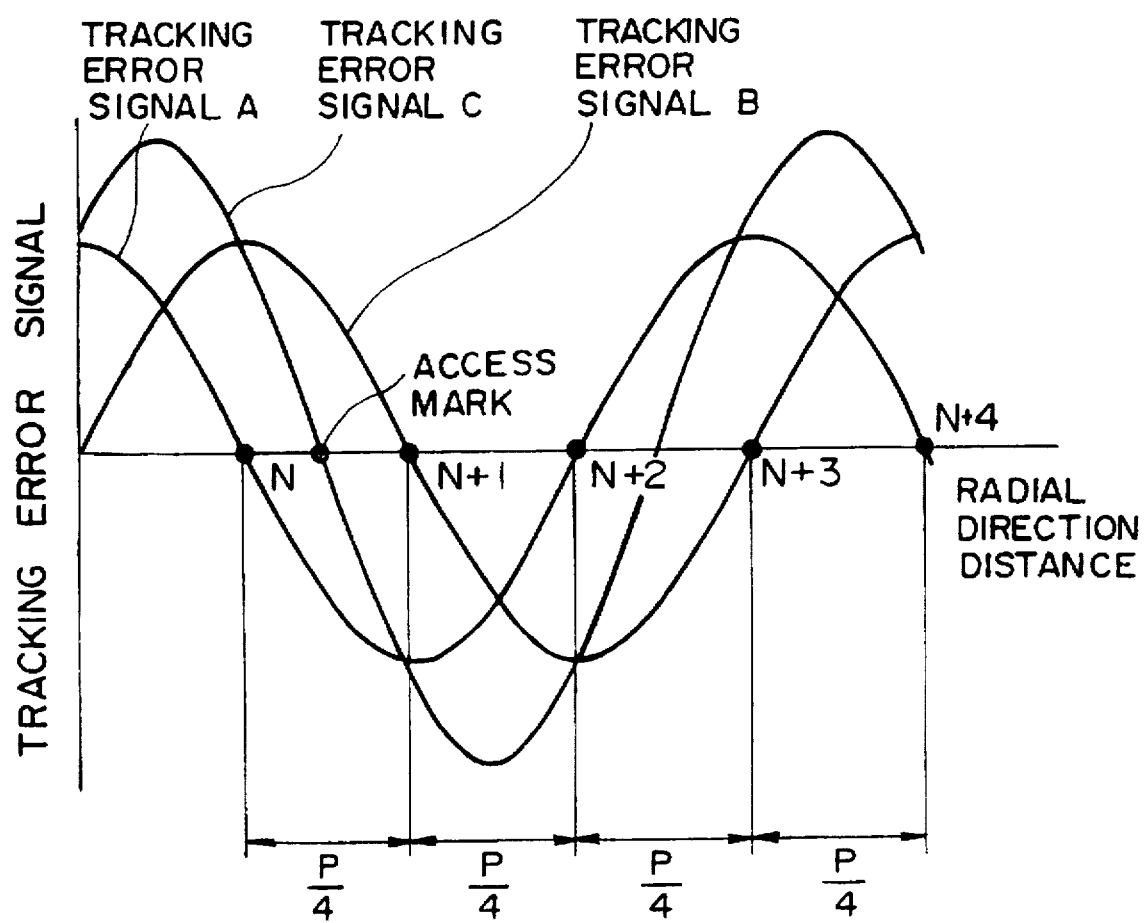
FIG. 6 is a waveform diagram of tracking error signals obtainable by the servo signal detector in FIG. 4.

FIG. 6 is a waveform diagram showing the tracking error signals A, B and C when the light spot is displaced in the radial direction of the optical disk 100.

The light spot can be positioned at data tracks N,N+1, . . . , which are arranged at intervals; of P in the radial direction by detecting the zero cross points where the polarity of the tracking error signal A changes from minus to plus when the light spot is displaced toward the outside of the radial direction (the zero cross points where the polarity of the tracking error signal A changes from plus to minus when the light spot is displaced toward the inside of the radial direction). Further, the light spot can be positioned at data tracks N+2, N+6, . . . , which are arranged; of P in the radial direction by detecting zero cross points for tracking error signal −A obtained by inverting the tracking error signal A.

Likewise, the light spot can be positioned at data tracks N+1, N+3, . . . , which are arranged at intervals of P in the radial direction by detecting zero cross points for the tracking error signal B and the tracking error signal −B.

After all, the light spot can be positioned at intervals of P/4 in the radial direction by detecting zero cross points of tracking error signals A, B, −A and −B.

Figure 7:
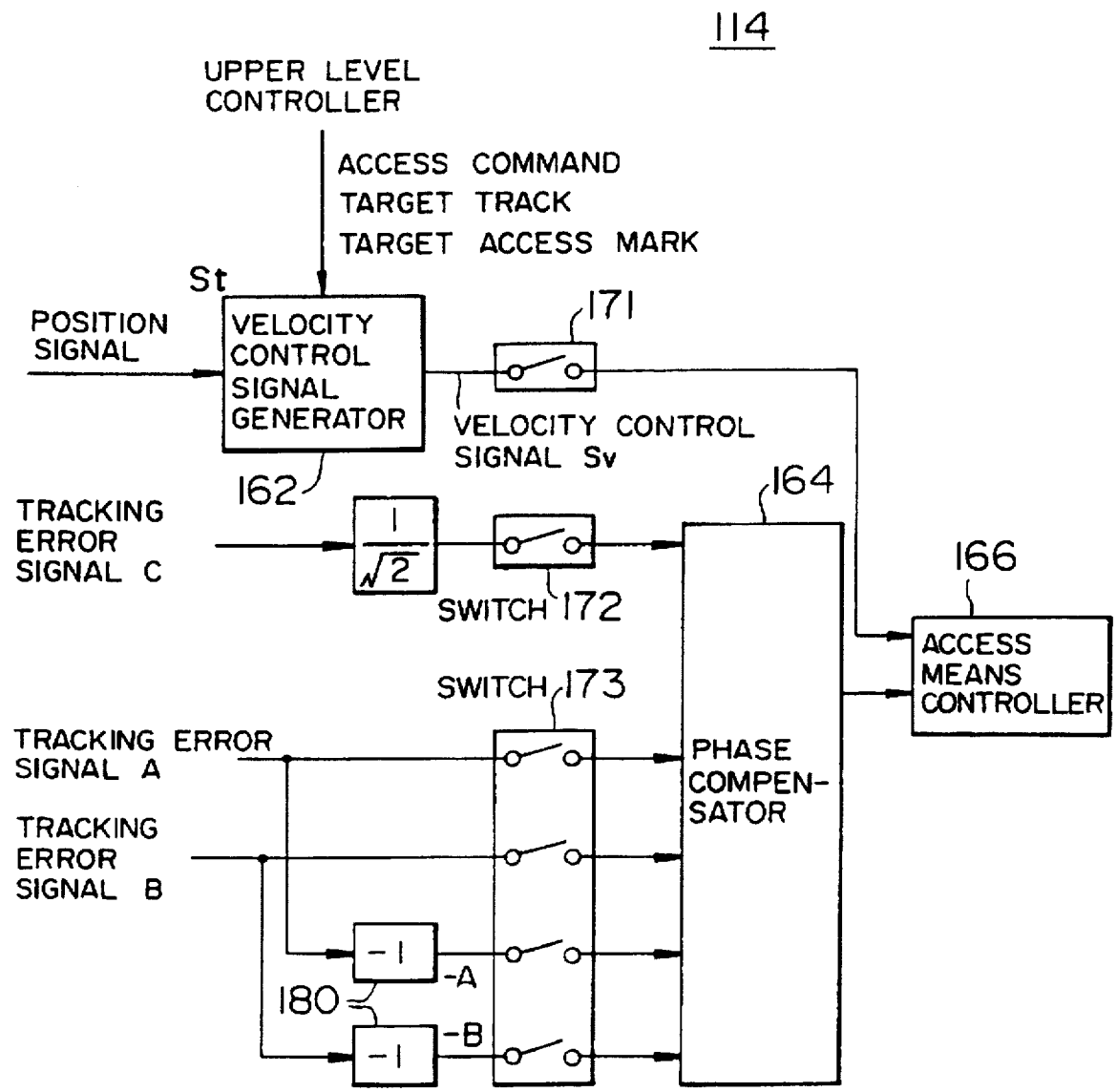
FIG. 7 is a circuit block diagram of a servo controller according to the first embodiment of the present invention.

FIG. 7 is a circuit block diagram showing the servo control circuit 114 mentioned above.

When an access command, a target track and a target access mark are input from the upper-level controller, first of all, the switch 171 closes. A velocity control signal generating circuit 162 generates a velocity control signal Sv from the position signal and the target access mark. The access means circuit 166 starts an access action of radially positioning the light spot to the target access mark on the basis of the velocity control signal Sv. When the light spot reaches the vicinity of the target access mark, the switch 171 opens and at the same time the switch 172 closes, so that a tracking error signal C multiplied by $1/\sqrt{2}$ to standardize the amplitude is input through the phase compensator 164 to the access means controller 166. Thus, the access means controller 166 positions the light spot to the target access mark.

Next, the switch 172 opens and, at the same time, one (that corresponds to the target track) of the switches 173 closes, so that one (that corresponds to the target track) of the tracking error signals A and B and tracking error signals −A and −B obtained by inverting the tracking error signals A and B by the inverter circuit 180 is input through the phase compensator 164 to the access means controller 166. Whereupon, the access means controller 166 positions the light spot to the target track and, at the same time, starts the tracking action.

For example, if the target track is track N in FIG. 6, the tracking error signal A is selected with the corresponding switch 173. Then, the access means controller 166 positions the light spot to track N and, at the same time, starts the tracking action.

A jump to the adjacent track is done through the manipulation of the switches 173.

For example, a jump from track N to track N+1 is done by changing over the switches 173 from the tracking error signal A to the tracking error signal B.

When the track 12 is located at the same radial position as the access mark, as in the description of the prior art, the tracking error signal C is not required. Likewise, also when the light spot need not be positioned to the target access mark, the tracking error signal C is not required.

By the use of the tracking control method for an optical disk, the optical disk device 200, and the optical disk 100 according to the first embodiment described above, the data tracks can be positioned at intervals of P/4 in the radial direction, so that a higher recording density can be realized.

Figure 8:
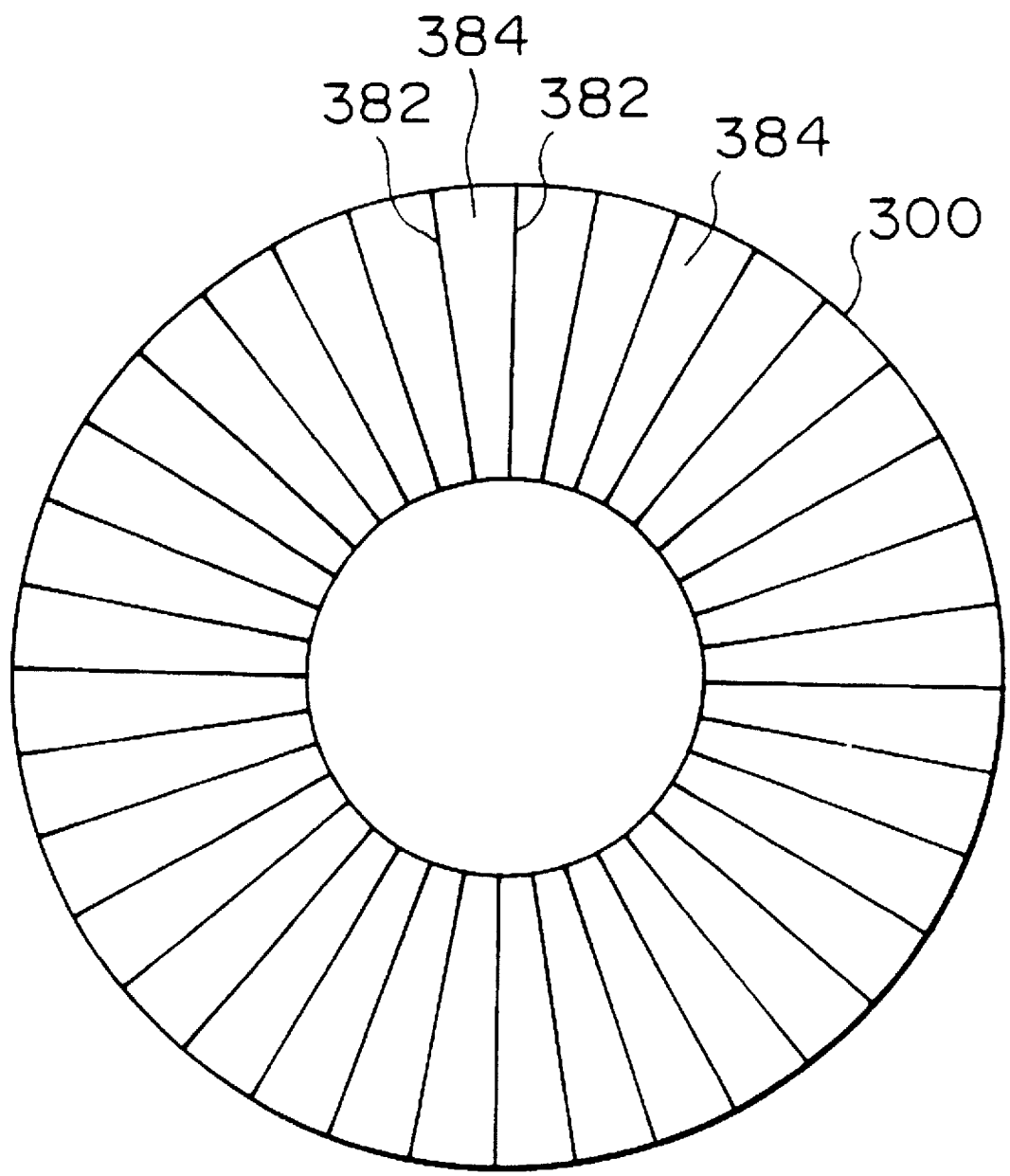
FIG. 8 is a plan view of an optical disk according to a second embodiment of the present invention.

FIG. 8 is a plan view of an optical disk according to a second embodiment of the present invention.

This optical disk 300 confirms to the DBF, and therefore servo areas 382, 382, ... for detecting a servo signal are provided at fixed angle intervals, and data areas 384, 384, ... for recording data are provided between the servo areas 382, 382, ....

Figure 9:
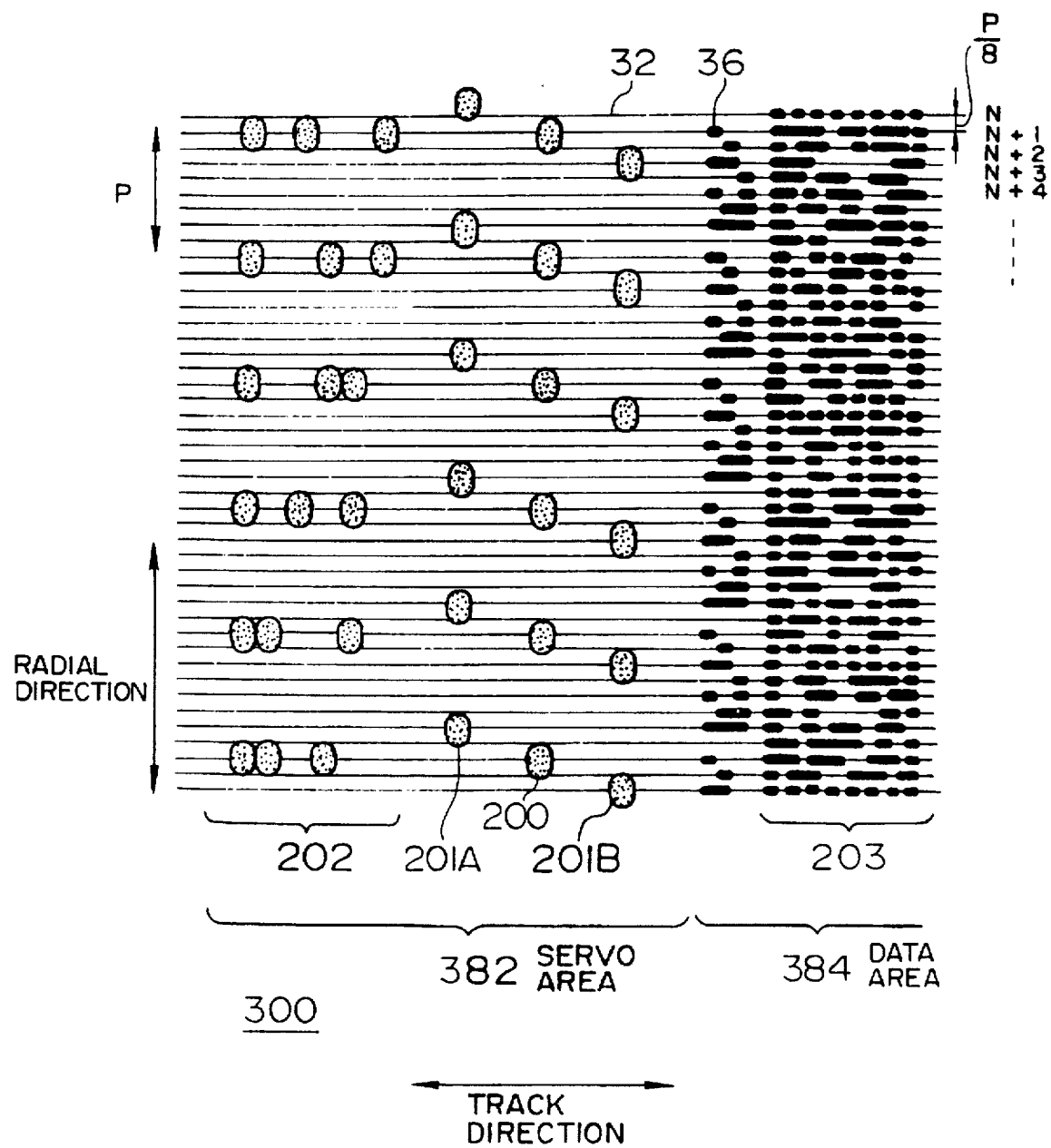
FIG. 9 is a partial view, on an enlarged scale, of an optical disk according to a second embodiment of the present invention.

As shown in FIG. 9, in the servo area 382, clock marks 200 are arranged at intervals of P in the radial direction of the optical disk, wobble marks 201A are arranged so as to deviate by P/4 toward the outside of the radial direction from the clock marks, and wobble marks 201B are arranged so as to deviate by P/4 toward the inside of the radial direction from the clock marks. In other words, in the servo area 382, there are columns of marks in a total of three phases, that is, a column of marks of a datum phase and columns of two different phases. In addition, access marks 202 are arranged at the same radial positions as the clock marks mentioned above.

On the other hand, in the data area 384, data tracks 32 are arranged at intervals of P/8. On each data track 32, ID marks 36 are arranged when necessary.

Figure 10:
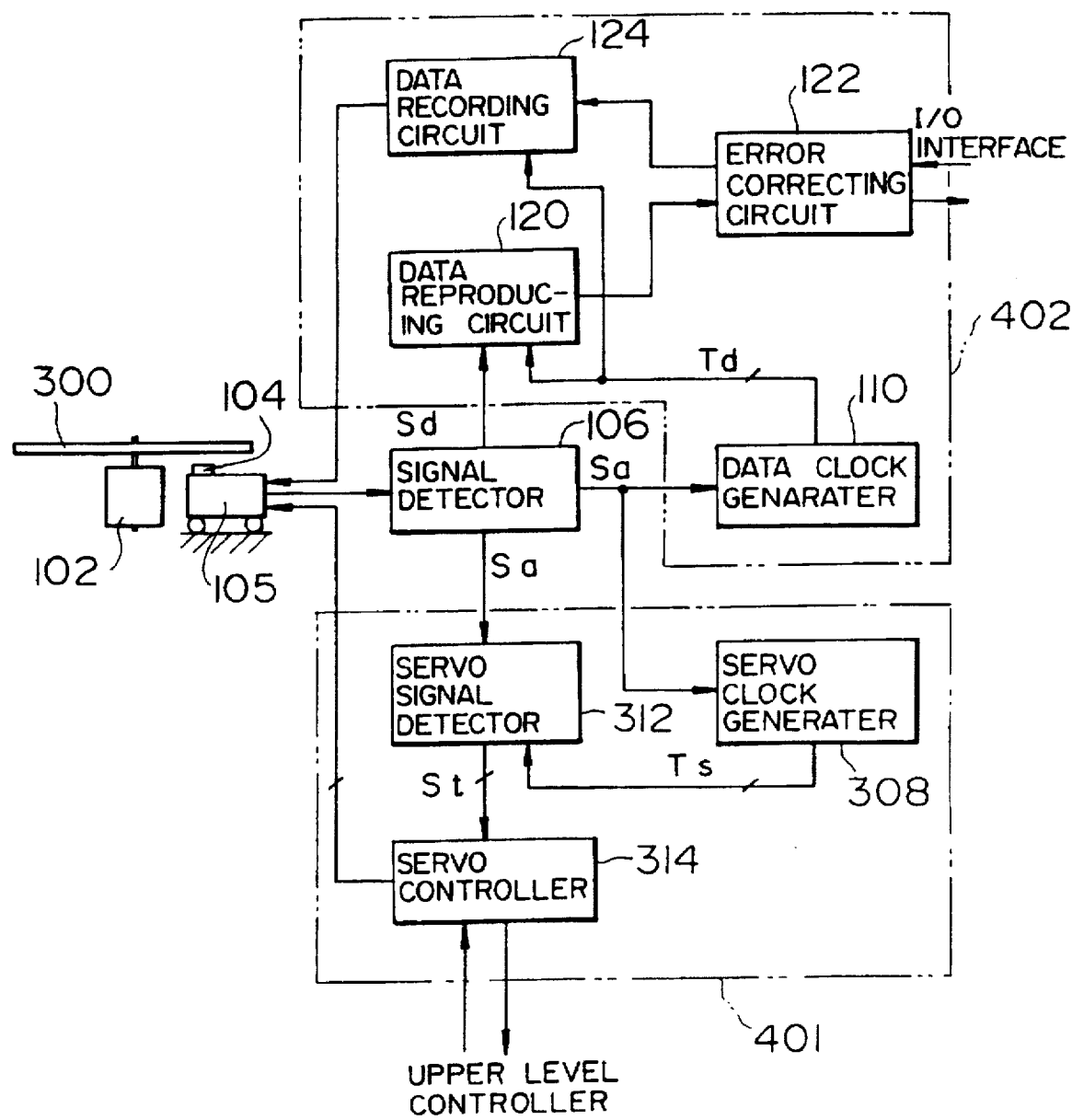
FIG. 10 is a block diagram showing an optical disk device using the optical disk in FIG. 8.

FIG. 10 is a block diagram of an optical disk device for reproducing data from and recording data onto the optical disk 300 mentioned above.

This optical disk device 400 includes an optical disk 300, a spindle motor 102, an optical head 104, an access means 105, a signal detector 106, a tracking control device 401, and a recording/reproducing device 402.

The optical disk 300 is driven to rotate by the spindle motor 102.

A laser beam from the optical head 104 mounted on the access means 105 is converged to form a light spot on the optical disk 300. The diameter of the light spot is P/8 to P. The light intensity is distributed in a Gaussian distribution, for example.

A reflected light from the optical disk is received by the optical head 104, converted into an electric signal, and guided to the signal detector 106. From this electric signal, the signal detector 106 generates a total light quantity signal Sa representing the total light quantity of the reflected light, and also generates a data signal Sd.

The tracking control device 401 includes a servo clock generator 308, a servo signal detector 312, and a servo controller 314.

The PLL in the servo clock generator 308 generates a servo clock signal for detecting a servo signal and sample-and-hold signals Ts in synchronism with changes in the total light quantity signal Sa when the light spot passes the clock marks on the optical disk 300. Those signals are sent to the servo signal detector 312.

The servo signal detector 312 generates tracking error signals and a position signal St representing the position of the light spot from the total light signal Sa based on the servo clock signal and the sample-and-hold signals Ts. Those signals are sent to the servo controller 314.

The servo controller 314 generates a servo control signal by using the tracking error signals and the position signal St in response to a command from an upper-level controller (not shown). The servo control signal is sent to the access means 105 so that the access means 105 can perform an access action and a tracking action.

The recording/reproducing device 402 includes a data clock generator 110, a data reproducing circuit 120, an error correcting circuit 122, and an data recording circuit 124. The data clock generator 110, the data reproducing circuit 120, the error correcting circuit 122, and the data recording circuit 124 are arranged in the same circuit configuration as the corresponding component circuits in the first embodiment.

Figure 11:
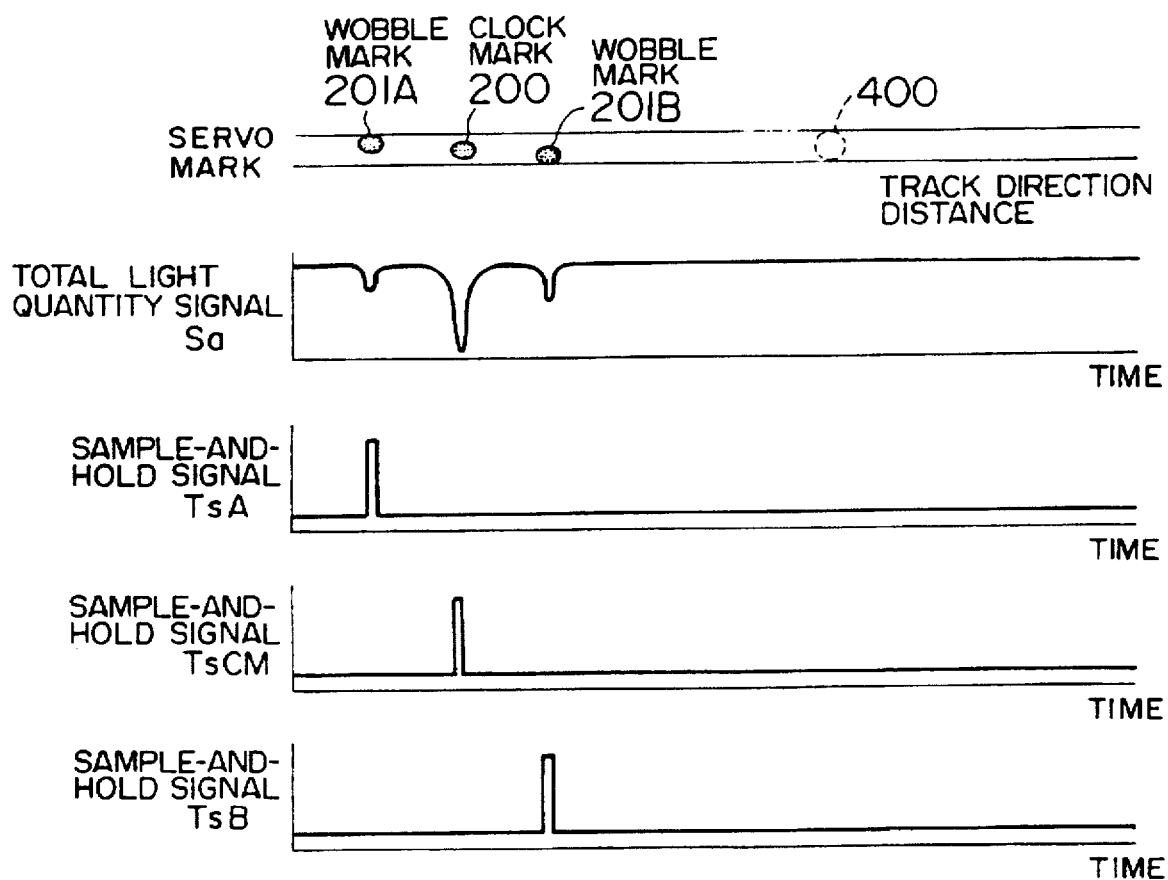
FIG. 11 an explanatory diagram of the total light quantity signal and sample-and-hold signals.

FIG. 11 is a diagram showing the timing between changes in the total light quantity signal Sa and the sample-and-hold signals Ts.

The above-mentioned sample-and-hold signals Ts include a sample-and-hold signal TsA timed with the wobble mark 201, sample-and-hold signal TsCM timed with the clock mark 200, and a sample-and-hold signal TsB timed with the wobble mark 201B.

Figure 12:
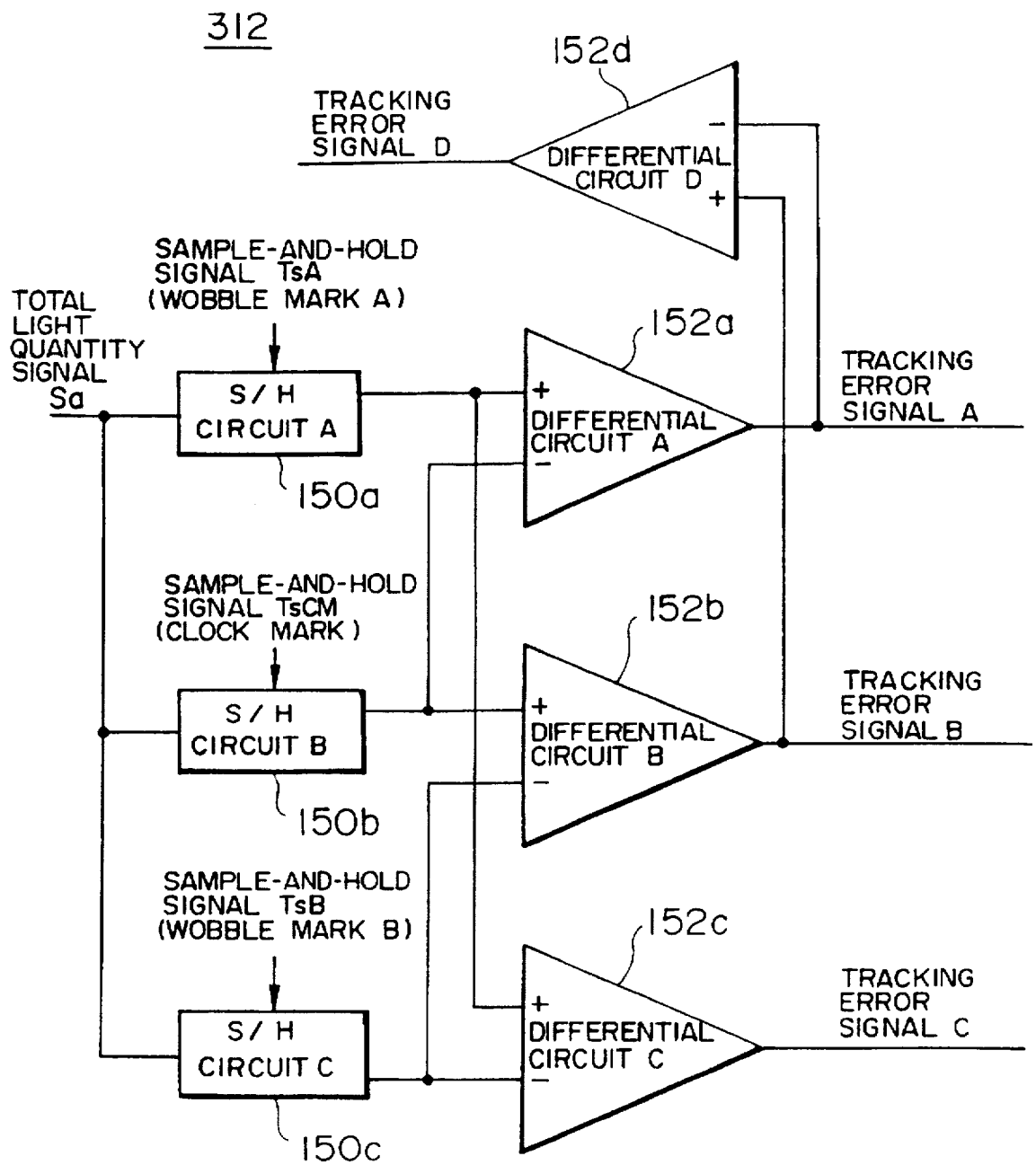
FIG. 12 is a circuit block diagram showing a servo signal detector according to the second embodiment.

FIG. 12 is a circuit diagram showing that portion of the servo signal detector 312 which generates tracking error signals.

A sample-and-hold circuit 150a samples and holds the total light quantity signal Sa by the sample-and-hold signal TsA, and therefore holds the light quantity signal corresponding to the wobble mark A.

A sample-and-hold circuit 150b samples and holds the total light quantity signal Sa based on the sample-and-hold signal TsCM, and therefore holds the light quantity signal corresponding to the clock mark.

A sample-and-hold circuit 150c samples and holds the total light quantity signal Sa based on the sample-and-hold signal TsB, and therefore holds the light quantity signal corresponding to the wobble mark B.

A differential circuit 152a subtracts the light quantity signal corresponding to the clock mark from the light quantity signal corresponding to the wobble mark A to generate a tracking error signal A.

A differential circuit 152b subtracts the light quantity signal corresponding to the wobble mark B from the light quantity signal corresponding to the clock mark to generate a tracking error signal B.

A differential circuit 152c subtracts the light quantity signal corresponding to the light quantity signal corresponding to the wobble mark B from the light quantity signal corresponding to the wobble mark A to generate a tracking error signal C.

A differential circuit 152d subtracts the tracking error signal B from the tracking error signal A to generate a tracking error signal D.

The tracking error signals A, B, C and D are held until the light spot has passed the next servo area.

Figure 13:
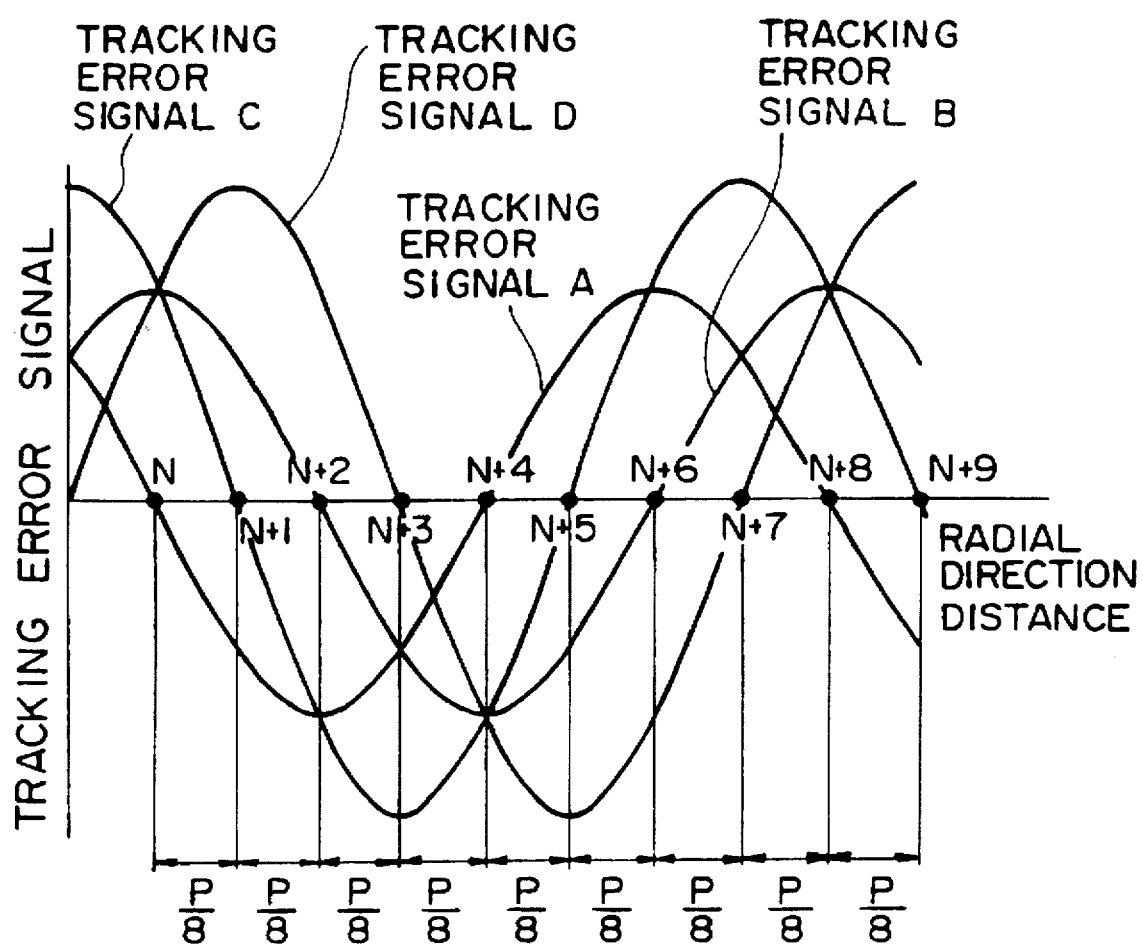
FIG. 13 is a waveform diagram of tracking error signals obtainable by the servo signal detector in FIG. 11.

FIG. 13 is a waveform diagram showing the tracking error signals A, B, C and D when the light spot is displaced in the radial direction of the optical disk 300.

The light spot can be positioned at data tracks N, N+8, . . . , which arranged at intervals of P in the radial direction by detecting the zero cross points where the polarity of the tracking error signal A changes from minus to plus when the light spot is displaced toward the outside of the radial direction (the zero cross points where the polarity of the tracking error signal A changes from plus to minus when the light spot is displaced toward the inside of the radiation direction). In addition, data tracks N+4, N +12, . . . can be positioned at intervals of P in the radial direction by detecting the zero cross points of a tracking error signal −A obtained by inverting the tracking error signal A.

Similarly, the light spot can be positioned at data tracks N+2, N+10, . . . , which are arranged at intervals of P in the radial direction by detecting the zero cross points of the tracking error signals B and −B.

Similarly, the light spot can be positioned at data tracks N+1, N+9, . . . , which are arranged at intervals; of P in the radial direction by detecting the zero cross points of the tracking error signals C and −C.

Similarly, the light spot can be positioned at data tracks N+3, N+11, . . . , which are arranged at intervals; of P in the radial direction by detecting the zero cross points of the tracking error signals D and −D.

After all, by detecting the zero cross points of the tracking error signals A, B, C, D, −A, −B, −C and −D, the light spot can be positioned at intervals of P/8 in the radial direction.

Figure 14:
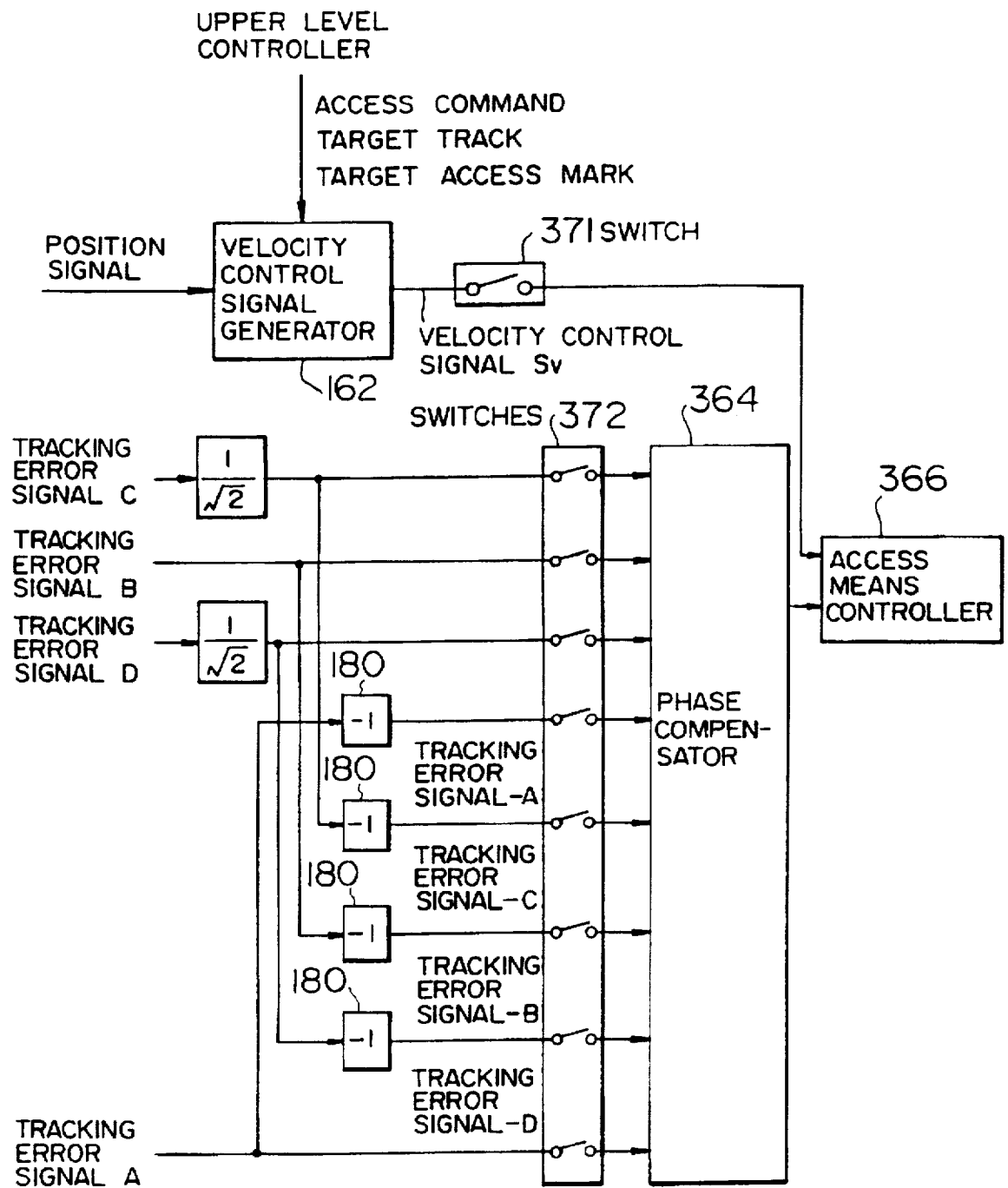
FIG. 14 is a circuit block diagram of a servo controller according to the second embodiment.
Figure 15:
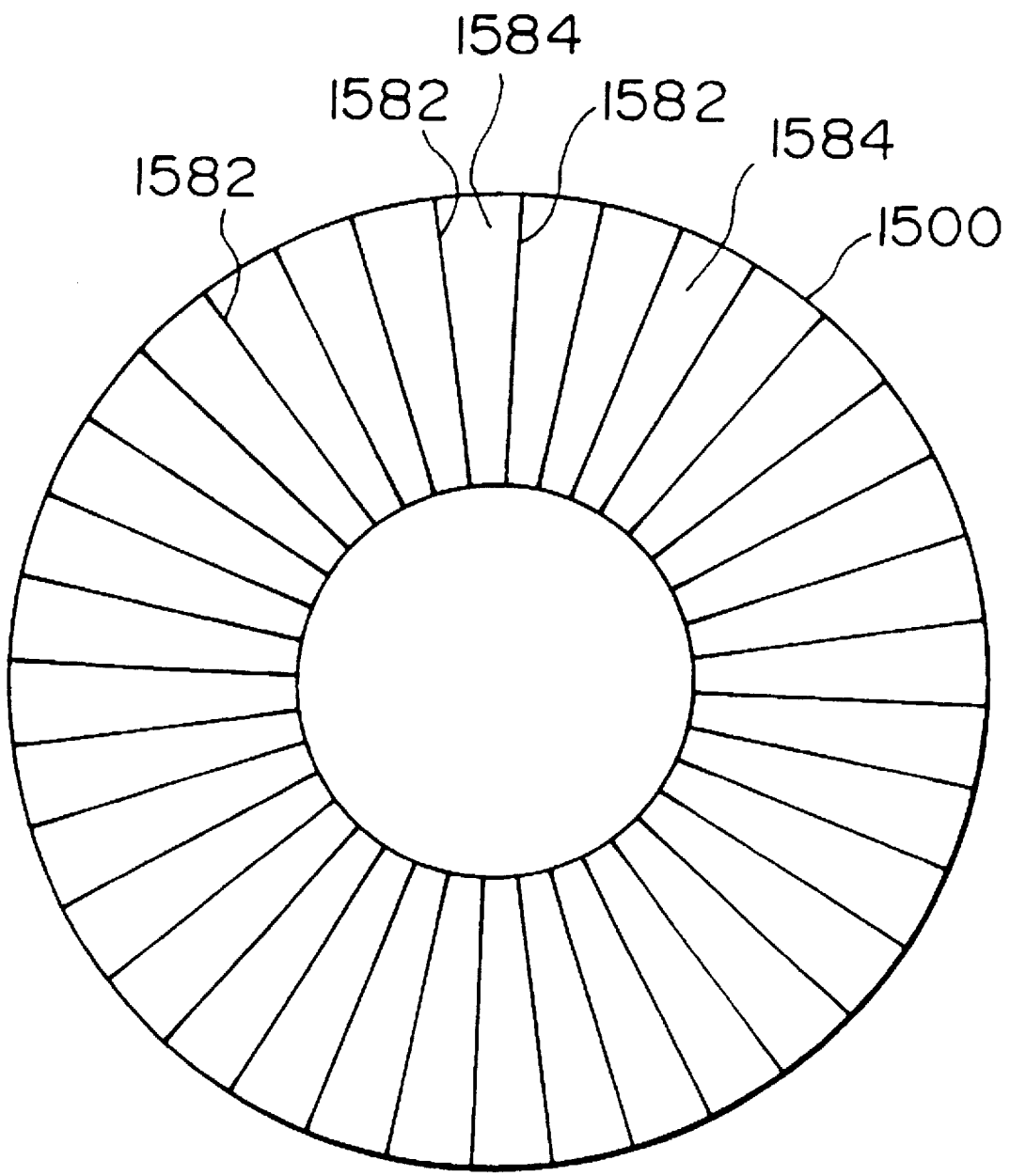
FIG. 15 is a plan view of an example of a background optical disk.
Figure 16:
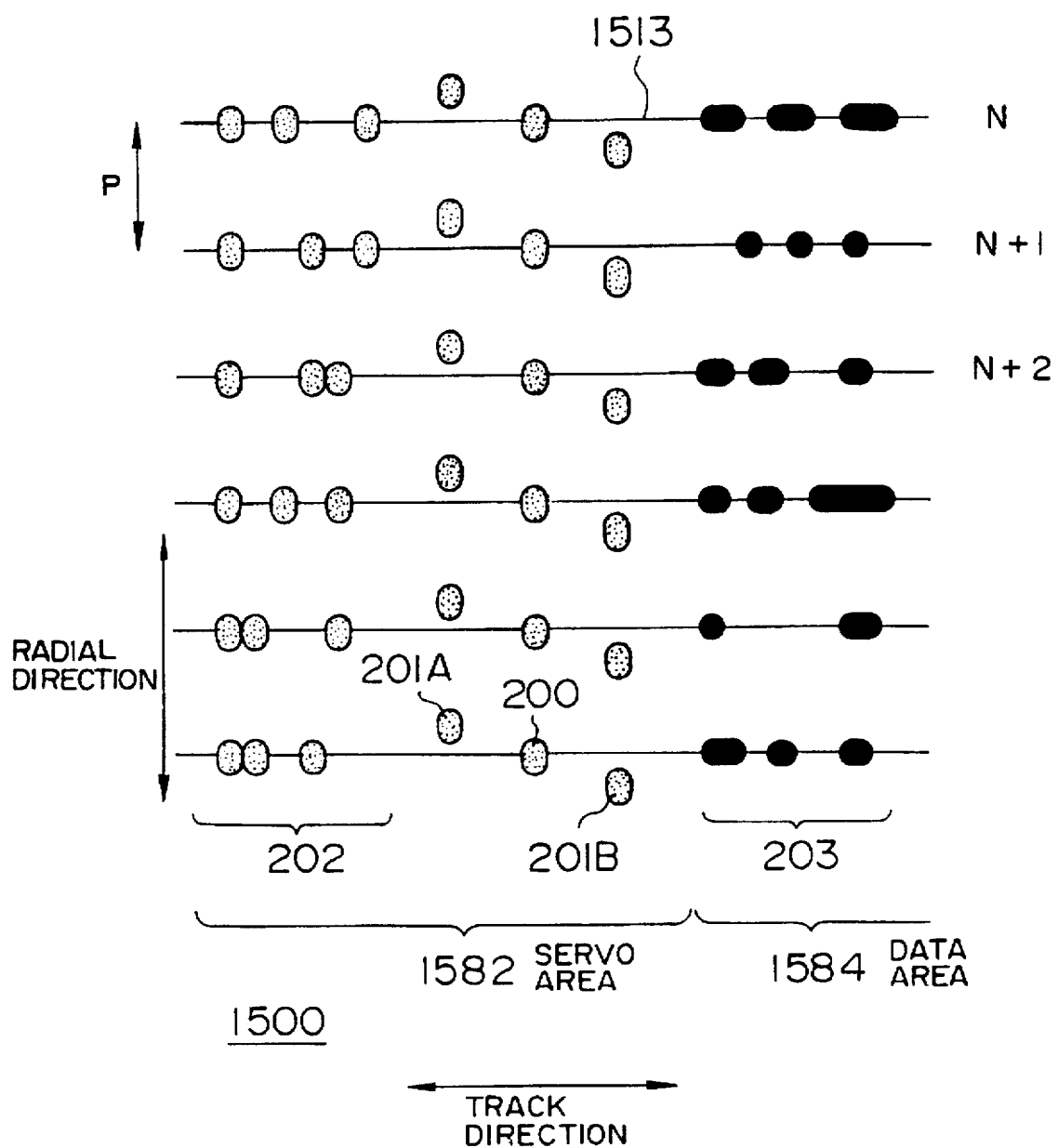
FIG. 16 is a partial view, on an enlarged scale, of the optical disk in FIG. 15.
Figure 17:
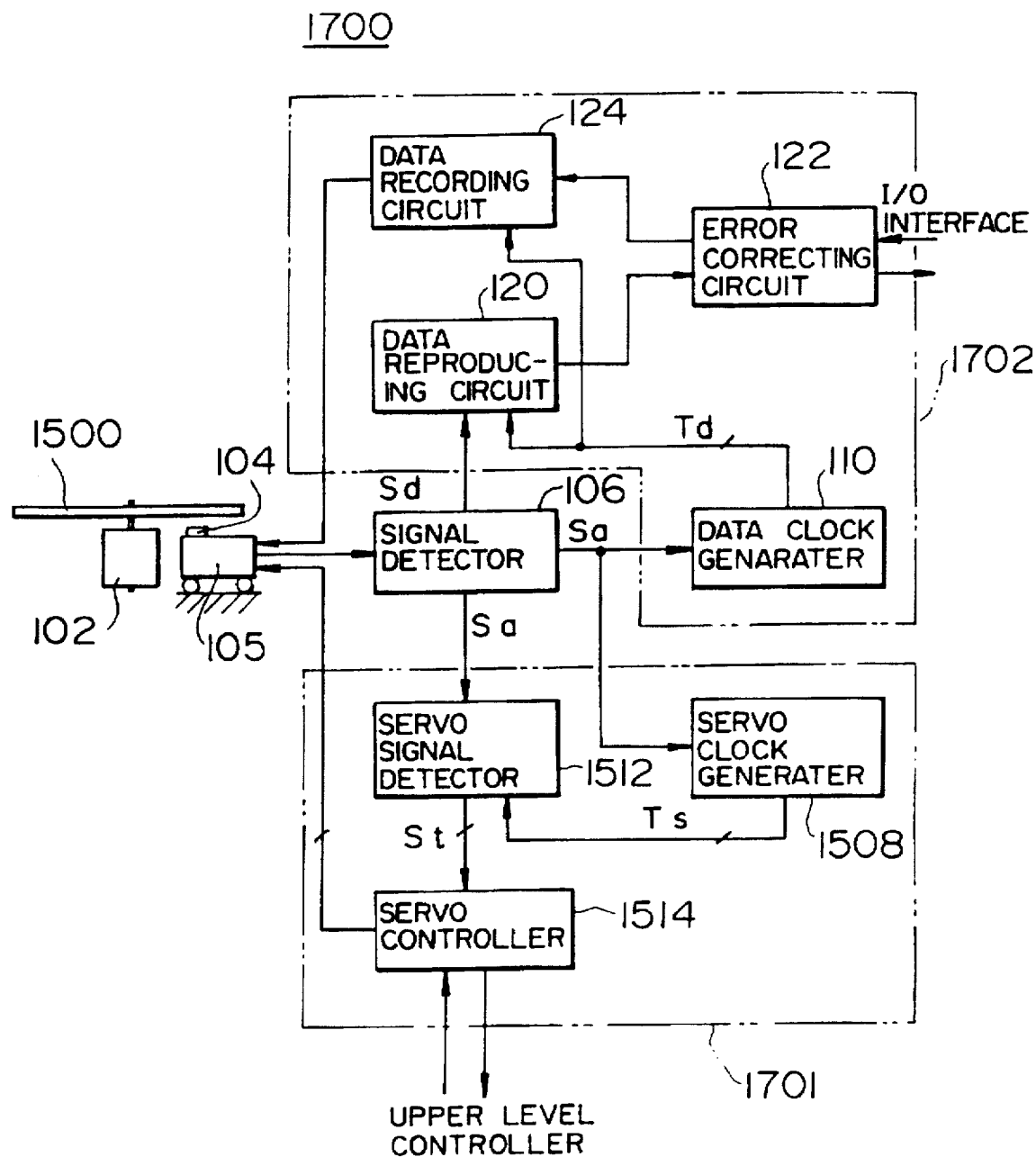
FIG. 17 is a block diagram showing an optical disk device using the optical disk in FIG. 15.
Figure 18:
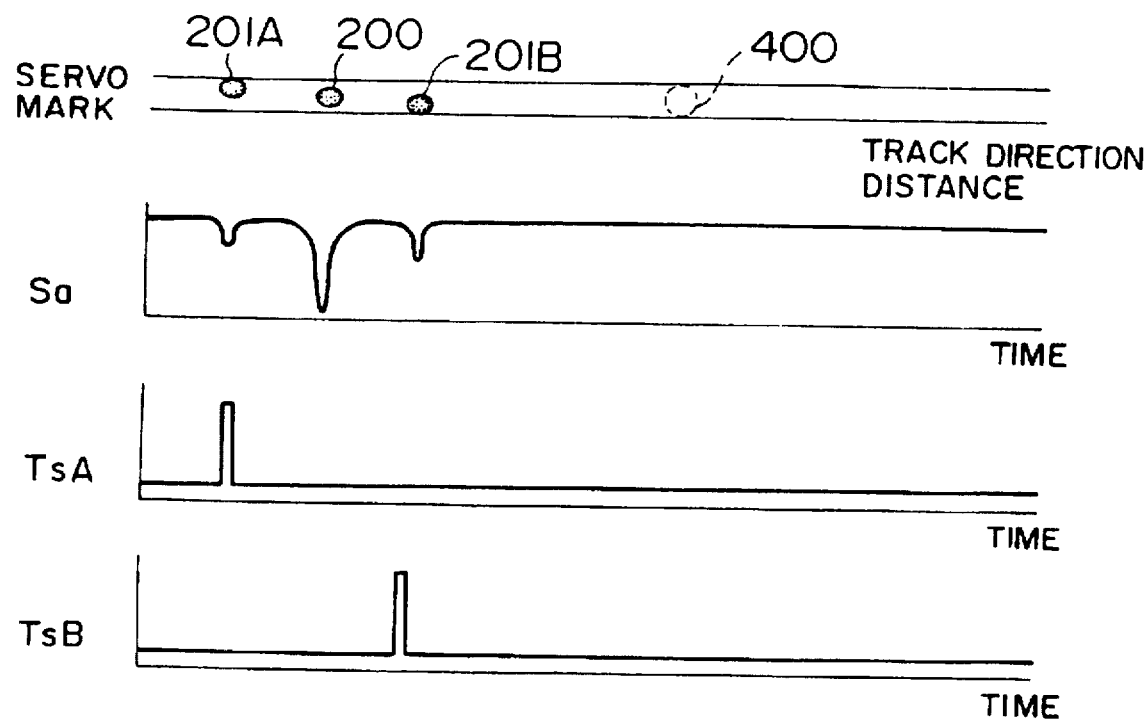
FIG. 18 is an explanatory diagram of a total light quantity signal and sample-and-hold signals.
Figure 19:
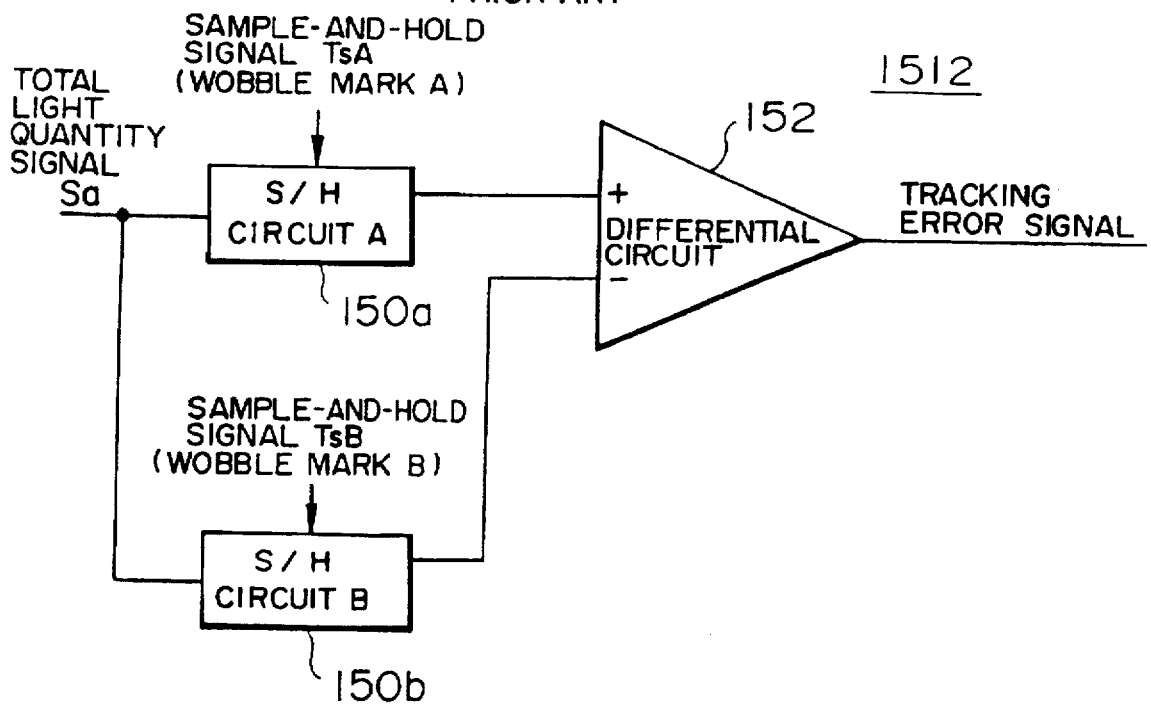
FIG. 19 is a circuit block diagram showing a background servo signal detector.
Figure 20:
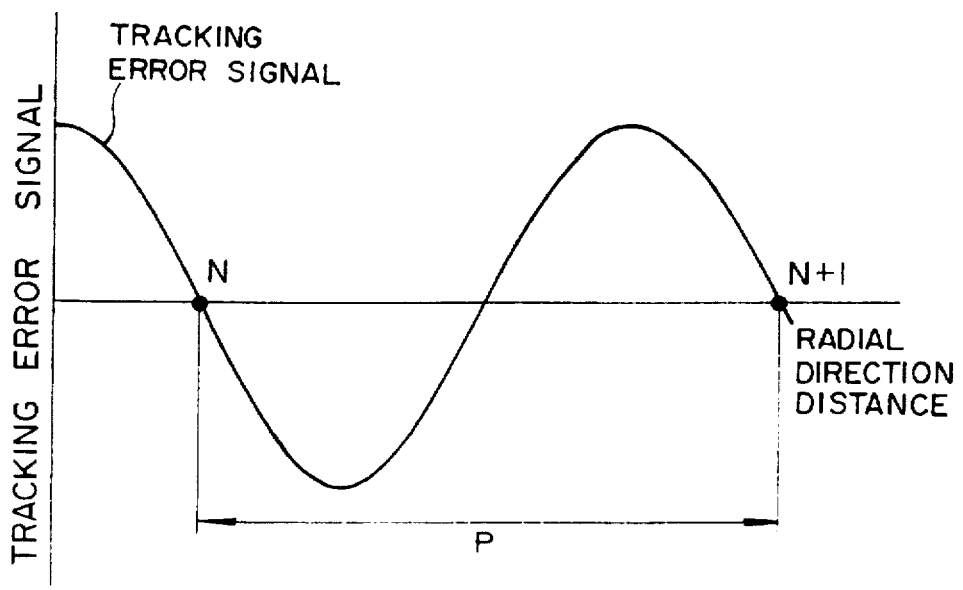
FIG. 20 is a waveform diagram showing a tracking error signal obtainable by the servo signal detector in FIG. 18.
Figure 21:
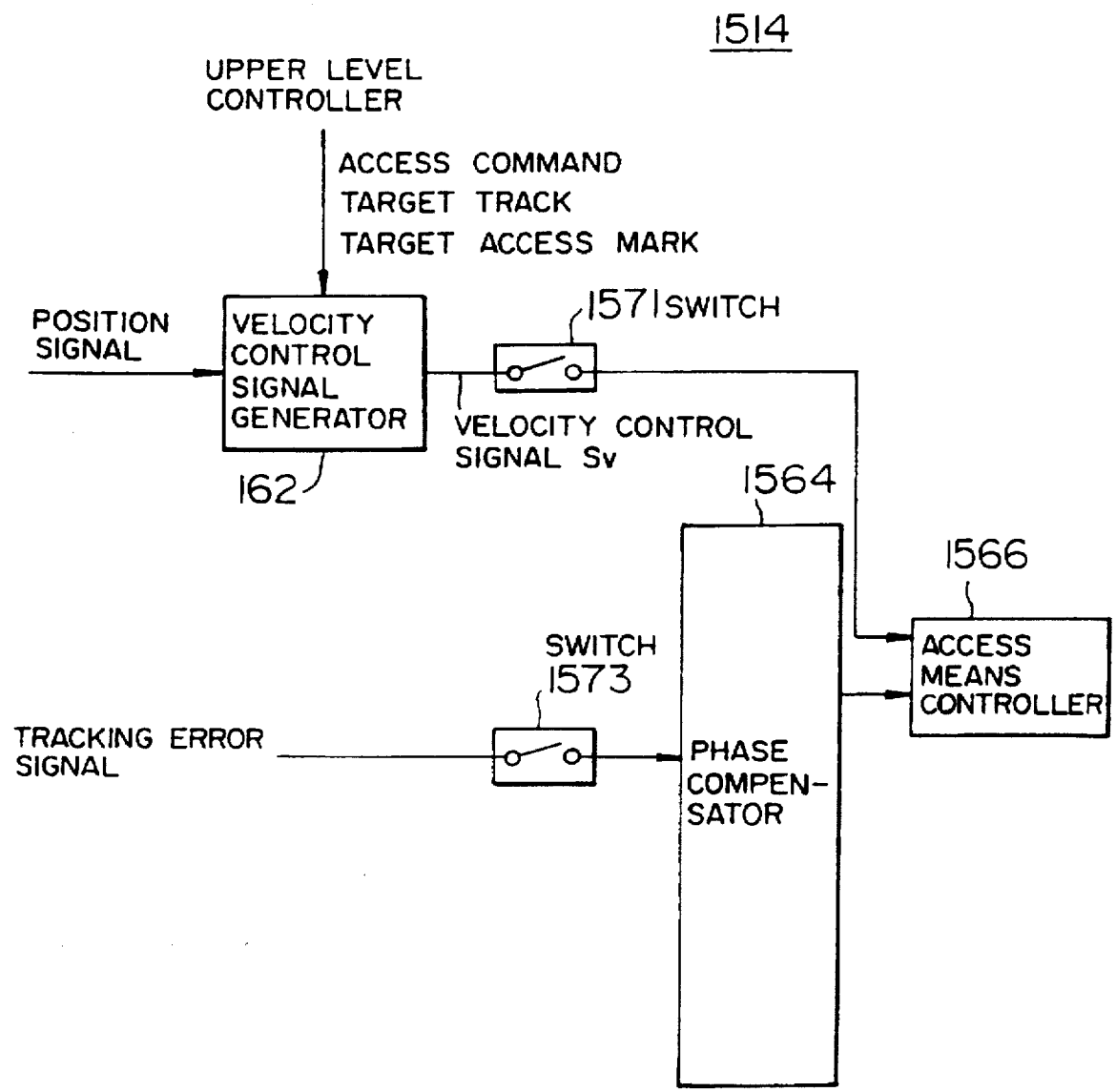
FIG. 21 is a circuit block diagram showing a background servo controller.
Figure 22:
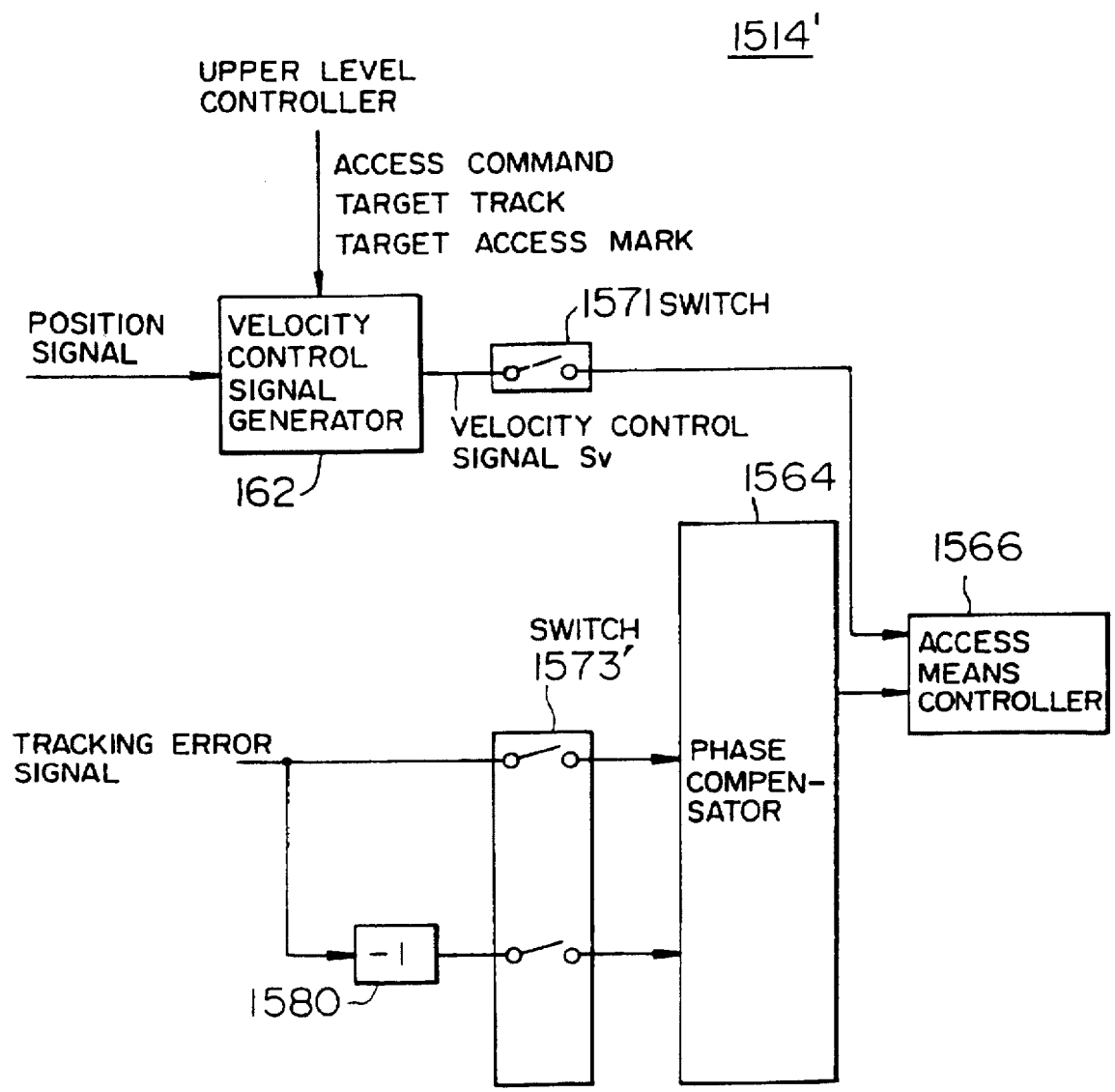
FIG. 22 is a circuit block diagram showing an improved servo controller.
Figure 23:
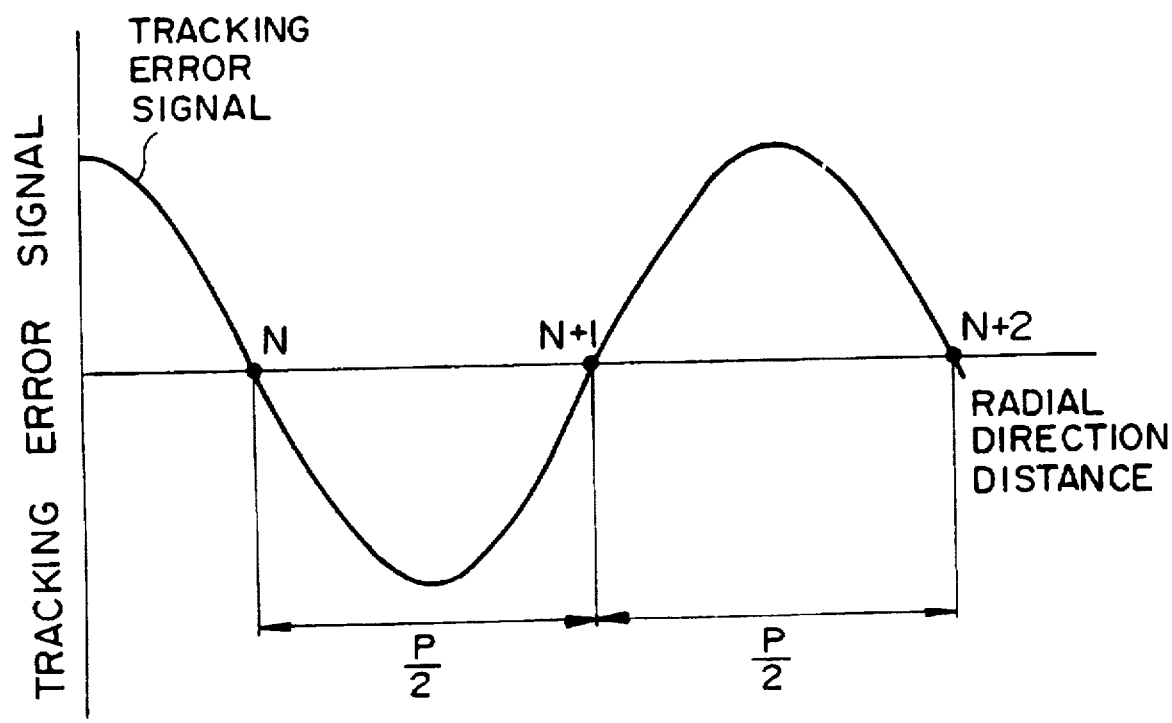
FIG. 23 is an explanatory diagram of intervals of data tracks obtainable by the servo controller in FIG. 22.
Figure 24:
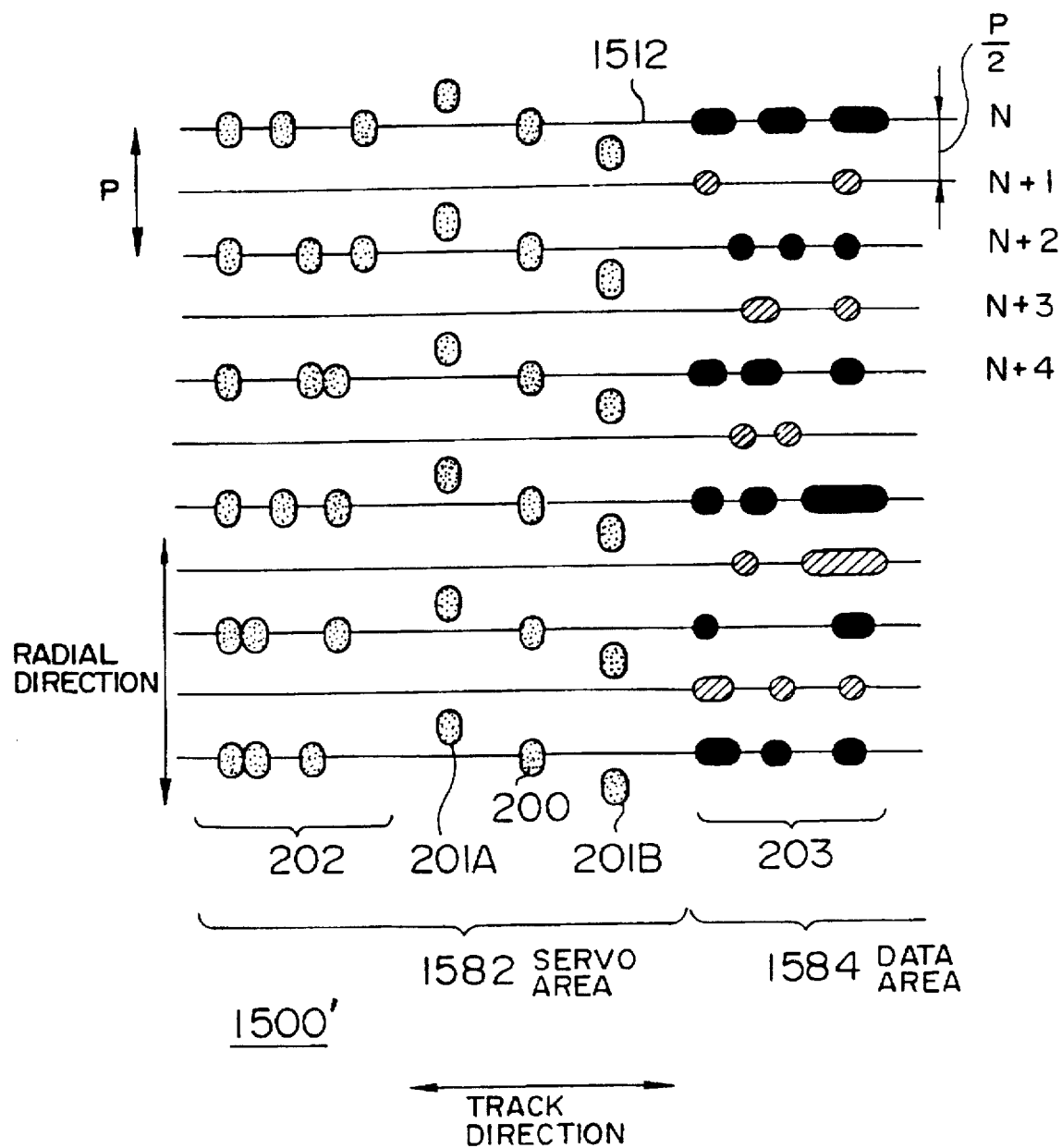
FIG. 24 is a partial view, on an enlarged scale, of an optical disk compatible with the servo controller in FIG. 22.

FIG. 14 is a circuit block diagram of the servo controller 314 mentioned above.

When an access command, a target track, and a target access mark are input from the hot control circuit, the switch 371 closes at first. The velocity control signal generating circuit 162 generates a velocity control signal Sv from the position signal and the target access mark. An access means controller 366 starts an access action of radially positioning the light spot to the target access mark on the basis of the velocity control signal Sv. When the light spot reaches the vicinity of the target access mark, the switch 371 opens and, at the same time, the switch 372 closes, so that one of the switches 372 which corresponds to the tracking error signal C closes, and the tracking error signal C multiplied by $1/\sqrt{2}$ to standardize the amplitude is input through the phase compensator 164 to the access means controller 366. Whereupon, the access means controller 366 positions the light spot to the target access mark.

Next, one (that corresponds to the target track) of the switches 372 selectively closes, one (that corresponds to the target track) of the tracking error signals A, B, C, D and the tracking error signals −A, −B, −C and −D obtained by inverting those plus tracking error signals by the inverter circuit 180 is input to the access means controller 366 through the phase compensator 364. Accordingly, the access means controller 366 positions the light spot to track N and, at the same time, starts a tracking action.

If the target track is track N+1 in FIG. 13, for example, the tracking error signal C is selected by the switch 372. In this case, the positioning action to the target access mark coincides with the tracking action.

A jump to the adjacent track is done by changing-over the switches 372.

For example, if a jump is done from track N+1 to track N+2 is done by changing over the switches 372 to switch from the tracking error signal C to the tracking error signal B.

According to the tracking control method for an optical disk, the optical disk device 400 and the optical disk 300 according to the second embodiment, the data tracks can be positioned at intervals of P/8 and, therefore, a higher recording density can be obtained.

In the second embodiment mentioned above, if only the tracking error signals C, D, −C and −D are used, the data tracks can be positioned at intervals of P/4 in the radial direction. Having large amplitudes, the tracking error signals C and D contribute to improving the signal-to-noise ratio, which is desirable.

In the above embodiments, all tracks are arranged at intervals of either entirely P/4 or P/8 in the radial direction. However, some tracks may be arranged at intervals of P/4 or P/8, and the other tracks may be positioned at intervals of P, P/2, P/4 or P/8.

Meanwhile, the reference marks Mk may be arranged at intervals of P in the radial direction of the optical disk, and the deviant marks H1 and H2 may be arranged so as to deviate by P/2 and P/4 toward the outside of the radial direction from the reference marks Mk to form columns of marks of a total of three phases.

Alternatively, the reference marks Mk may be arranged at intervals of P in the radial direction of the optical disk, and the deviant marks H1 and H2 may be arranged so as to deviate by P/2 and P/4 toward the outside of the radial direction from the reference marks Mk and, furthermore, deviant marks H3 may be arranged so as to deviate by P/4 toward the inside of the radial direction from the reference marks Mk to form columns of marks of a total of three phases.

According to the optical disk tracking control method, the optical disk device and the optical disk of the present invention, the data tracks can be positioned at intervals of P/4 or less and, therefore, a higher recording density than in the prior art can be realized.

We claim:

1. For use with an optical disk having a plurality of reference marks Mk arranged at intervals of P in the radial direction and deviant marks H1 arranged so as to deviate by P/4 toward the outside of the radial direction from the reference marks and deviant marks H2 arranged so as to deviate by P/4 toward the inside of the radial direction from the reference marks, an optical disk tracking control method comprising the steps of:

generating a tracking error signal A from a difference between a light quantity corresponding to said deviant mark H1 and a light quantity corresponding to said reference mark Mk;

generating a tracking error signal B from a difference between the light quantity corresponding to said reference mark Mk and a light quantity corresponding to said deviant mark H2;

generating a tracking error signal C from a difference between the light quantity corresponding to said deviant mark H1 and the light quantity corresponding to said deviant mark H2;

generating a tracking error signal D from a difference between said tracking error signal A and said tracking error signal B; and positioning a light spot on data tracks which are arranged at intervals of P/8 in the radial direction based on the tracking error signals A, B, C and D.

2. A tracking control method according to claim 1, wherein said reference marks Mk are clock marks and said deviant marks H1 and H2 are wobble marks.

3. A tracking control method according to claim 2, wherein a plurality of access marks are located at a same radial positions as said clock marks, wherein said light spot is positioned to the access mark in the radial direction based on said tracking error signal C.

4. A tracking control method according to claim 1, wherein the light spot is positioned on data tracks by detecting zero-cross points of said tracking error signals A, B, C, and D.

5. A tracking control method according to claim 1, wherein the light spot is positioned on data tracks by detecting zero-cross points of said tracking error signals A, B, C and D and sign-inverted tracking error signals −A, −B, −C, and −D.

6. An optical disk device for reproducing data from or recording data onto an optical disk having a plurality of reference marks Mk arranged at intervals of P in the radial direction, deviant marks H2 arranged so as to deviate by P/4 toward the outside of the radial direction from the reference marks Mk, and deviant marks H2 arranged so as to deviate by P/4 toward the inside of the radial direction from said reference marks Mk, said optical disk device comprising:

a servo signal detector for generating a tracking error signal A from a difference between a light quantity corresponding to said deviant mark H1 and a light quantity corresponding to said reference mark Mk, generating a tracking error signal B from a difference between the light quantity corresponding to said reference mark Mk and a light quantity corresponding to said deviant mark H2, generating a tracking error signal C from a difference between the light quantity corresponding to said deviant mark H1 and the light quantity corresponding to said deviant mark H2, and generating a tracking error signal D from a difference between said tracking error signal A and said tracking error signal B; and a servo controller for generating a servo control signal for positioning a light spot on data tracks which are arranged at intervals of P/8 in the radial direction based on said tracking error signals A, B, C and D.

* * * * *